United States Patent
Carmen, Jr.

(10) Patent No.: US 10,587,147 B2
(45) Date of Patent: *Mar. 10, 2020

(54) TWO-PART LOAD CONTROL SYSTEM MOUNTABLE TO A SINGLE ELECTRICAL WALLBOX

(71) Applicant: Lutron Technology Company LLC, Coopersburg, PA (US)

(72) Inventor: Lawrence R. Carmen, Jr., Bath, PA (US)

(73) Assignee: Lutron Technology Company LLC, Coopersburg (*) Notice: Subject to any disclaimer, the term of this patent is extended or adjusted under 35 U.S.C. 154(b) by 0 days.

This patent is subject to a terminal disclaimer.

(21) Appl. No.: 15/150,496

(22) Filed: May 10, 2016

(65) Prior Publication Data
US 2016/0254699 A1 Sep. 1, 2016

Related U.S. Application Data

(63) Continuation of application No. 13/598,522, filed on Aug. 29, 2012, now Pat. No. 9,368,025.
(Continued)

(51) Int. Cl.
*H02J 50/10* (2016.01)
*H05B 37/02* (2006.01)
(Continued)

(52) U.S. Cl.
CPC ............. *H02J 50/10* (2016.02); *G08C 19/16* (2013.01); *H02J 7/025* (2013.01); *H02J 50/80* (2016.02);
(Continued)

(58) Field of Classification Search
CPC ............ H05B 37/0227; H05B 32/0272; H05B 39/088; G08C 19/16; H04B 5/0037;
(Continued)

(56) References Cited

U.S. PATENT DOCUMENTS 4,864,588 A 9/1989 Simpson et al.
4,932,037 A 6/1990 Simpson et al.
(Continued)

FOREIGN PATENT DOCUMENTS

CA 2892464 A1 11/2015
CN 101789978 A 7/2010
(Continued)

OTHER PUBLICATIONS

"CEDIA 2012: Crestron Demos Home Technology Control Solution with NFC-Enabled Mobile Device" Available at http://www.youtube.com/watch?v=qXwoTJX14BE retrieved on Aug. 13, 2013 Video Provided on CD Media Sep. 8, 2012 pp. 1-2.
(Continued)

*Primary Examiner* — Alfonso Perez Borroto
*Assistant Examiner* — Esayas G Yeshaw
(74) *Attorney, Agent, or Firm* — Amy Yanek; Philip Smith; Glen Farbanish

(57) ABSTRACT

A load control system includes a load control device and a remote control for configuring and controlling operation of the load control device. The load control device and remote control may be mounted to an electrical wallbox. The system may be configured by associating the remote control with the load control device, and actuating a button on the remote control to configure the load control device. A second remote control device may be directly or indirectly associated with the load control device. The load control device and remote control may communicate via inductive coils that are magnetically coupled together. The remote control may be operable to charge a battery from energy derived from the magnetic coupling between the inductive coils. The load control device and remote control may include near-field communication modules that are operable to communicate wirelessly via near-field radiation.

26 Claims, 17 Drawing Sheets

Related U.S. Application Data

(60) Provisional application No. 61/528,492, filed on Aug. 29, 2011.

(51) Int. Cl.
    *H05B 39/08* (2006.01)
    *H04W 4/80* (2018.01)
    *H04B 5/00* (2006.01)
    *G08C 19/16* (2006.01)
    *H02J 50/80* (2016.01)
    *H02J 7/02* (2016.01)

(52) U.S. Cl.
    CPC ......... *H04B 5/0037* (2013.01); *H04B 5/0093* (2013.01); *H04W 4/80* (2018.02); *H05B 37/0227* (2013.01); *H05B 37/0272* (2013.01); *H05B 39/088* (2013.01)

(58) Field of Classification Search
    CPC ........ H04B 5/0093; H02J 50/80; H02J 50/10; H02J 7/025; H04W 4/008
    See application file for complete search history.

(56) References Cited

U.S. PATENT DOCUMENTS

| | | |
|---|---|---|
| 4,995,053 A | 2/1991 | Simpson et al. |
| 5,239,205 A | 8/1993 | Hoffman et al. |
| 5,340,954 A | 8/1994 | Hoffman et al. |
| 5,454,077 A | 9/1995 | Cheron |
| 5,488,571 A | 1/1996 | Jacobs et al. |
| 5,519,704 A | 5/1996 | Farinacci et al. |
| 5,602,540 A * | 2/1997 | Spillman, Jr. ............ G01D 5/48 340/870.31 |
| 5,627,863 A | 5/1997 | Aslanis et al. |
| 5,637,930 A * | 6/1997 | Rowen ................. H01H 3/0213 307/112 |
| 5,637,964 A | 6/1997 | Hakkarainen et al. |
| 5,736,965 A | 4/1998 | Mosebrook et al. |
| 5,812,819 A | 9/1998 | Rodwin et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,982,103 A | 11/1999 | Mosebrook et al. |
| 6,167,464 A | 12/2000 | Kretschmann |
| 6,169,377 B1 | 1/2001 | Bryde et al. |
| 6,300,727 B1 | 10/2001 | Bryde et al. |
| 6,324,089 B1 | 11/2001 | Symoen et al. |
| 6,380,696 B1 | 4/2002 | Sembhi et al. |
| 6,437,692 B1 | 8/2002 | Petite et al. |
| 6,526,581 B1 | 2/2003 | Edson |
| 6,545,434 B2 | 4/2003 | Sembhi et al. |
| 6,687,487 B1 | 2/2004 | Mosebrook et al. |
| 6,803,728 B2 | 10/2004 | Balasubramaniam et al. |
| 6,807,463 B1 | 10/2004 | Cunningham et al. |
| 6,831,569 B2 | 12/2004 | Wang et al. |
| 6,856,236 B2 | 2/2005 | Christensen et al. |
| 6,859,644 B2 | 2/2005 | Wang |
| 6,876,295 B1 | 4/2005 | Lewis |
| 6,879,806 B2 | 4/2005 | Shorty |
| 6,891,838 B1 | 5/2005 | Petite et al. |
| 6,903,650 B2 | 6/2005 | Murray |
| 6,914,533 B2 | 7/2005 | Petite |
| 6,914,893 B2 | 7/2005 | Petite |
| 6,927,547 B2 | 8/2005 | Walko et al. |
| 6,980,080 B2 | 12/2005 | Christensen et al. |
| 7,035,270 B2 | 4/2006 | Moore, Jr. et al. |
| 7,053,767 B2 | 5/2006 | Petite et al. |
| 7,085,627 B2 | 8/2006 | Bamberger et al. |
| 7,089,066 B2 | 8/2006 | Hesse et al. |
| 7,102,502 B2 | 9/2006 | Autret |
| 7,103,511 B2 | 9/2006 | Petite |
| 7,106,261 B2 | 9/2006 | Nagel et al. |
| 7,126,291 B2 | 10/2006 | Kruse et al. |
| 7,211,968 B2 | 5/2007 | Adamson et al. |
| 7,218,998 B1 | 5/2007 | Neale |
| 7,219,141 B2 | 5/2007 | Bonasia et al. |
| 7,307,542 B1 | 12/2007 | Chandler et al. |
| 7,323,991 B1 | 1/2008 | Eckert et al. |
| 7,345,270 B1 | 3/2008 | Jones et al. |
| 7,346,016 B2 | 3/2008 | Nielsen et al. |
| 7,358,927 B2 | 4/2008 | Luebke et al. |
| 7,362,285 B2 | 4/2008 | Webb et al. |
| 7,408,525 B2 | 8/2008 | Webb et al. |
| 7,498,952 B2 | 3/2009 | Newman, Jr. |
| 7,525,928 B2 | 4/2009 | Cutler |
| 7,548,216 B2 | 6/2009 | Webb et al. |
| 7,573,208 B2 | 8/2009 | Newman, Jr. et al. |
| 7,573,436 B2 | 8/2009 | Webb et al. |
| 7,598,684 B2 | 10/2009 | Lys et al. |
| 7,687,744 B2 | 3/2010 | Walter et al. |
| 7,697,492 B2 | 4/2010 | Petite |
| 7,714,790 B1 | 5/2010 | Feldstein et al. |
| 7,755,505 B2 | 7/2010 | Johnson et al. |
| 7,756,086 B2 | 7/2010 | Petite et al. |
| 7,756,097 B2 | 7/2010 | Uehara et al. |
| 7,756,556 B2 | 7/2010 | Patel et al. |
| 7,805,134 B2 | 9/2010 | Mirza-Baig |
| 7,821,160 B1 | 10/2010 | Roosli et al. |
| 7,852,765 B2 | 12/2010 | Neuman et al. |
| 7,853,221 B2 | 12/2010 | Rodriguez et al. |
| 7,889,051 B1 | 2/2011 | Billig et al. |
| 8,013,732 B2 | 9/2011 | Petite et al. |
| 8,031,650 B2 | 10/2011 | Petite et al. |
| 8,035,255 B2 | 10/2011 | Kurs et al. |
| 8,146,074 B2 | 3/2012 | Ito et al. |
| 8,173,920 B2 | 5/2012 | Altonen et al. |
| 8,228,163 B2 | 7/2012 | Cash et al. |
| 8,254,838 B2 | 8/2012 | Feldstein |
| 8,339,247 B2 | 12/2012 | Adamson et al. |
| 8,364,319 B2 | 1/2013 | Roosli |
| 8,368,310 B1 * | 2/2013 | Roosli ................ H05B 37/0245 315/152 |
| 8,379,564 B2 | 2/2013 | Petite et al. |
| 8,396,007 B2 | 3/2013 | Gonia et al. |
| 8,416,074 B2 | 4/2013 | Sadwick |
| 8,525,372 B2 * | 9/2013 | Huang ................. H01H 9/0271 200/329 |
| 8,548,607 B1 | 10/2013 | Belz et al. |
| 8,598,978 B2 | 12/2013 | Knode |
| 8,742,686 B2 | 6/2014 | Zampini, II et al. |
| 8,792,401 B2 | 7/2014 | Banks et al. |
| 8,892,261 B2 | 11/2014 | Hoonhout et al. |
| 9,066,381 B2 | 6/2015 | Valois et al. |
| 9,178,369 B2 * | 11/2015 | Partovi ................... H02J 7/025 |
| 9,288,228 B2 | 3/2016 | Suumaki |
| 9,445,482 B2 | 9/2016 | Brochu et al. |
| 9,445,485 B2 | 9/2016 | Reed |
| 9,548,797 B1 | 1/2017 | Green et al. |
| 9,641,959 B2 | 5/2017 | Brochu et al. |
| 9,766,645 B2 | 9/2017 | Imes et al. |
| 9,767,249 B1 | 9/2017 | Belz et al. |
| 2001/0024164 A1 | 9/2001 | Kawamura et al. |
| 2002/0043938 A1 | 4/2002 | Lys |
| 2002/0060530 A1* | 5/2002 | Sembhi ................ H05B 37/029 315/291 |
| 2002/0073183 A1 | 6/2002 | Yoon et al. |
| 2002/0087436 A1 | 7/2002 | Guthrie et al. |
| 2002/0113909 A1 | 8/2002 | Sherwood |
| 2002/0154025 A1 | 10/2002 | Ling |
| 2003/0034898 A1 | 2/2003 | Shamoon et al. |
| 2003/0040813 A1 | 2/2003 | Gonzales et al. |
| 2003/0109270 A1 | 6/2003 | Shorty |
| 2003/0151493 A1 | 8/2003 | Straumann et al. |
| 2003/0197993 A1 | 10/2003 | Mirowski et al. |
| 2004/0036624 A1 | 2/2004 | Ballew et al. |
| 2004/0052076 A1 | 3/2004 | Mueller et al. |
| 2004/0058706 A1 | 3/2004 | Williamson et al. |
| 2004/0059840 A1 | 3/2004 | Perego et al. |
| 2004/0193998 A1 | 9/2004 | Blackburn et al. |
| 2004/0217718 A1 | 11/2004 | Kumar et al. |
| 2005/0030153 A1 | 2/2005 | Mullet et al. |
| 2005/0045429 A1 | 3/2005 | Baker |

(56) References Cited

U.S. PATENT DOCUMENTS

| | | |
|---|---|---|
| 2005/0048944 A1 | 3/2005 | Wu |
| 2005/0156708 A1 | 7/2005 | Puranik et al. |
| 2005/0253538 A1 | 11/2005 | Shah et al. |
| 2005/0285547 A1 | 12/2005 | Piepgras et al. |
| 2006/0027081 A1 | 2/2006 | Chang et al. |
| 2006/0044152 A1 | 3/2006 | Wang |
| 2006/0109203 A1 | 5/2006 | Huber et al. |
| 2006/0154598 A1 | 7/2006 | Rudland et al. |
| 2006/0171332 A1 | 8/2006 | Barnum |
| 2006/0174102 A1 | 8/2006 | Smith et al. |
| 2006/0192697 A1 | 8/2006 | Quick et al. |
| 2006/0202851 A1 | 9/2006 | Cash et al. |
| 2006/0251059 A1 | 11/2006 | Otsu et al. |
| 2006/0256798 A1 | 11/2006 | Quick et al. |
| 2006/0273970 A1 | 12/2006 | Mosebrook et al. |
| 2006/0284734 A1 | 12/2006 | Newman, Jr. |
| 2006/0285150 A1 | 12/2006 | Jung et al. |
| 2007/0051529 A1* | 3/2007 | Soccoli .................. H02G 3/14 174/66 |
| 2007/0083294 A1 | 4/2007 | Bruno |
| 2007/0085699 A1 | 4/2007 | Walters et al. |
| 2007/0085700 A1 | 4/2007 | Walters et al. |
| 2007/0085701 A1 | 4/2007 | Walters et al. |
| 2007/0085702 A1 | 4/2007 | Walters et al. |
| 2007/0097993 A1 | 5/2007 | Bojahra et al. |
| 2007/0110192 A1 | 5/2007 | Steiner |
| 2007/0112939 A1 | 5/2007 | Wilson et al. |
| 2007/0121323 A1 | 5/2007 | Pawlik et al. |
| 2007/0165997 A1 | 7/2007 | Suzuki et al. |
| 2007/0176788 A1* | 8/2007 | Mor .................. G08C 17/02 340/13.24 |
| 2007/0229300 A1 | 10/2007 | Masato et al. |
| 2008/0055073 A1 | 3/2008 | Raneri et al. |
| 2008/0068126 A1 | 3/2008 | Johnson et al. |
| 2008/0068204 A1 | 3/2008 | Carmen et al. |
| 2008/0089266 A1 | 4/2008 | Orsat |
| 2008/0111491 A1 | 5/2008 | Spira |
| 2008/0136261 A1 | 6/2008 | Mierta |
| 2008/0136356 A1 | 6/2008 | Zampini et al. |
| 2008/0136663 A1 | 6/2008 | Courtney et al. |
| 2008/0147337 A1 | 6/2008 | Walters et al. |
| 2008/0148359 A1 | 6/2008 | Kezys et al. |
| 2008/0183316 A1 | 7/2008 | Clayton |
| 2008/0192767 A1 | 8/2008 | Howe et al. |
| 2008/0218099 A1 | 9/2008 | Newman |
| 2008/0258650 A1 | 10/2008 | Steiner et al. |
| 2008/0278297 A1 | 11/2008 | Steiner et al. |
| 2008/0284327 A1 | 11/2008 | Kang et al. |
| 2009/0001941 A1* | 1/2009 | Hsu .................. H02J 7/0044 323/211 |
| 2009/0079268 A1* | 3/2009 | Cook .................. H01Q 1/248 307/104 |
| 2009/0085408 A1 | 4/2009 | Bruhn |
| 2009/0113229 A1 | 4/2009 | Cataldo et al. |
| 2009/0150004 A1 | 6/2009 | Wang et al. |
| 2009/0167484 A1 | 7/2009 | Burr |
| 2009/0206983 A1 | 8/2009 | Knode et al. |
| 2009/0227205 A1* | 9/2009 | Rofougaran ......... H04B 5/0025 455/41.1 |
| 2009/0251352 A1 | 10/2009 | Altonen et al. |
| 2009/0302782 A1 | 12/2009 | Smith |
| 2009/0315672 A1 | 12/2009 | Nantz et al. |
| 2009/0322251 A1 | 12/2009 | Hilgers |
| 2010/0012738 A1 | 1/2010 | Park |
| 2010/0031076 A1 | 2/2010 | Wan et al. |
| 2010/0052574 A1 | 3/2010 | Blakeley et al. |
| 2010/0052576 A1 | 3/2010 | Steiner et al. |
| 2010/0081375 A1 | 4/2010 | Rosenblatt et al. |
| 2010/0104255 A1 | 4/2010 | Yun et al. |
| 2010/0114242 A1 | 5/2010 | Doerr et al. |
| 2010/0127821 A1 | 5/2010 | Jones et al. |
| 2010/0134341 A1* | 6/2010 | Priest .................. G08C 17/02 341/176 |
| 2010/0141153 A1 | 6/2010 | Recker et al. |
| 2010/0207532 A1 | 8/2010 | Mans |
| 2010/0207759 A1 | 8/2010 | Sloan et al. |
| 2010/0235008 A1 | 9/2010 | Forbes, Jr. et al. |
| 2010/0238001 A1 | 9/2010 | Veskovic |
| 2010/0238003 A1 | 9/2010 | Chan et al. |
| 2010/0244706 A1 | 9/2010 | Steiner et al. |
| 2010/0262296 A1 | 10/2010 | Davis et al. |
| 2010/0289430 A1* | 11/2010 | Stelzer .................. H05B 37/0254 315/307 |
| 2010/0303099 A1 | 12/2010 | Rieken |
| 2011/0006908 A1 | 1/2011 | Frantz |
| 2011/0012738 A1 | 1/2011 | Nakamura et al. |
| 2011/0039137 A1* | 2/2011 | Engle .................. H01M 10/425 429/90 |
| 2011/0043163 A1 | 2/2011 | Baarman |
| 2011/0046792 A1 | 2/2011 | Imes et al. |
| 2011/0095622 A1 | 4/2011 | Feldstein et al. |
| 2011/0121654 A1 | 5/2011 | Recker et al. |
| 2011/0202910 A1 | 8/2011 | Venkatakrishnan et al. |
| 2011/0208369 A1 | 8/2011 | Yang et al. |
| 2011/0244798 A1 | 10/2011 | Daigle et al. |
| 2011/0244897 A1 | 10/2011 | Shibuya |
| 2011/0282495 A1 | 11/2011 | Fischer et al. |
| 2011/0305200 A1 | 12/2011 | Schoofs et al. |
| 2012/0018578 A1 | 1/2012 | Polcuch |
| 2012/0039400 A1 | 2/2012 | Rieken |
| 2012/0086561 A1 | 4/2012 | Ilyes et al. |
| 2012/0086562 A1 | 4/2012 | Steinberg |
| 2012/0091910 A1 | 4/2012 | Zhang et al. |
| 2012/0093039 A1 | 4/2012 | Rofougaran et al. |
| 2012/0094658 A1 | 4/2012 | Macias et al. |
| 2012/0108230 A1 | 5/2012 | Stepanian |
| 2012/0158203 A1 | 6/2012 | Feldstein |
| 2012/0163663 A1 | 6/2012 | Masoud et al. |
| 2012/0175969 A1* | 7/2012 | Maughan .................. H01F 38/14 307/104 |
| 2012/0235504 A1* | 9/2012 | Kesler .................. H03H 7/40 307/104 |
| 2012/0235579 A1 | 9/2012 | Chemel et al. |
| 2012/0254961 A1 | 10/2012 | Kim et al. |
| 2012/0257543 A1 | 10/2012 | Baum et al. |
| 2012/0274670 A1 | 11/2012 | Lee et al. |
| 2012/0275391 A1 | 11/2012 | Cui et al. |
| 2012/0303768 A1 | 11/2012 | Fiennes |
| 2012/0306621 A1 | 12/2012 | Muthu |
| 2012/0315848 A1 | 12/2012 | Smith et al. |
| 2012/0322370 A1 | 12/2012 | Lee |
| 2012/0328302 A1 | 12/2012 | Iizuka et al. |
| 2013/0010018 A1 | 1/2013 | Economy |
| 2013/0014224 A1 | 1/2013 | Graves et al. |
| 2013/0026947 A1 | 1/2013 | Economy et al. |
| 2013/0030589 A1 | 1/2013 | Pessina et al. |
| 2013/0051375 A1 | 2/2013 | Chemishkian et al. |
| 2013/0073431 A1 | 3/2013 | Suro et al. |
| 2013/0100855 A1 | 4/2013 | Jung et al. |
| 2013/0134783 A1 | 5/2013 | Mohammediyan et al. |
| 2013/0187563 A1 | 7/2013 | Sasai et al. |
| 2013/0211844 A1 | 8/2013 | Sadwick |
| 2013/0223279 A1 | 8/2013 | Tinnakornsrisuphap et al. |
| 2013/0261821 A1 | 10/2013 | Lu et al. |
| 2013/0286889 A1 | 10/2013 | Cherian et al. |
| 2013/0322281 A1 | 12/2013 | Ludlow et al. |
| 2014/0070919 A1 | 3/2014 | Jackson et al. |
| 2014/0106735 A1 | 4/2014 | Jackson et al. |
| 2014/0163751 A1 | 6/2014 | Davis et al. |
| 2014/0175875 A1 | 6/2014 | Newman, Jr. et al. |
| 2014/0177469 A1 | 6/2014 | Neyhart |
| 2014/0180487 A1 | 6/2014 | Bull |
| 2014/0277805 A1 | 9/2014 | Browne, Jr. et al. |
| 2014/0289825 A1 | 9/2014 | Chan et al. |
| 2014/0304773 A1 | 10/2014 | Woods et al. |
| 2014/0375421 A1 | 12/2014 | Morrison et al. |
| 2014/0375428 A1 | 12/2014 | Park |
| 2015/0017973 A1 | 1/2015 | Gold |
| 2015/0097666 A1 | 4/2015 | Boyd et al. |
| 2015/0200925 A1 | 7/2015 | Lagerstedt et al. |
| 2015/0239353 A1* | 8/2015 | Cregut .................. B60L 11/182 320/108 |
| 2015/0259078 A1 | 9/2015 | Filipovic et al. |

(56) References Cited

U.S. PATENT DOCUMENTS

| | | |
|---|---|---|
| 2015/0342011 A1 | 11/2015 | Brochu et al. |
| 2016/0119032 A1 | 4/2016 | Choi et al. |
| 2016/0148449 A1 | 5/2016 | God et al. |
| 2016/0149411 A1 | 5/2016 | Neyhart |
| 2016/0254699 A1 | 9/2016 | Carmen, Jr. |
| 2016/0285550 A1 | 9/2016 | Economy |
| 2017/0064798 A1 | 3/2017 | Economy et al. |
| 2018/0168019 A1 | 6/2018 | Baker et al. |
| 2018/0198893 A1 | 7/2018 | Newman, Jr. et al. |
| 2018/0205460 A1 | 7/2018 | Economy |

FOREIGN PATENT DOCUMENTS

| | | |
|---|---|---|
| DE | 102006046489 A1 | 4/2008 |
| DE | 102009056152 A1 | 6/2011 |
| EP | 0767551 B1 | 8/2002 |
| EP | 1727399 A2 | 11/2006 |
| EP | 1693991 B1 | 7/2009 |
| GB | 2533675 A | 6/2016 |
| JP | 2011-023819 A | 2/2011 |
| WO | 1999046921 A2 | 9/1999 |
| WO | 2001052515 A1 | 7/2001 |
| WO | 2001074045 A1 | 10/2001 |
| WO | 2002071689 A2 | 9/2002 |
| WO | 2001052515 A9 | 10/2002 |
| WO | 2002071689 A3 | 11/2002 |
| WO | 2003007665 A1 | 1/2003 |
| WO | 2004023849 A1 | 3/2004 |
| WO | WO 2004/056157 A1 | 7/2004 |
| WO | WO 2006/133172 A2 | 12/2006 |
| WO | 2007069129 A2 | 6/2007 |
| WO | 2008040454 A2 | 4/2008 |
| WO | 2008092082 A2 | 7/2008 |
| WO | 2008095250 A1 | 8/2008 |
| WO | 2009010916 A2 | 1/2009 |
| WO | WO 2010/027412 A1 | 3/2010 |
| WO | 2010143130 A1 | 12/2010 |
| WO | 2011064244 A2 | 6/2011 |
| WO | 2018099793 A1 | 6/2018 |

OTHER PUBLICATIONS

"Crestron NFC Demo at CEDIA Expo 2012" Available at http://www.youtube.com/watch?v=FQ1f5vxwqnl Retrieved on Aug. 13, 2013 Transcript of Video provided on CD Media Sep. 10, 2012 pp. 1-2.

"SimpleLink™ CC3000 Boosterpack Jump-Starts the Internet of Things" Available at http://www.youtube.com/watch?v=6kh0g0KMIQc retrieved on Aug. 13, 2013 Transcript of Video provided on CD Media Jun. 6, 2013 1 page.

Black Rich "Clear Connect RF Technology" Lutron Electronics Company Inc. Aug. 2009 16 pages.

Gade Lisa "PalmOne Treo 600 Palm OS Smartphone from Sprint PCS" Oct. 28, 2013 Mobile Tech Review Document Available at: <http://www.mobiletechreview.com/treo_600.htm> Retrieved on May 21, 2013 4 Pages.

Gade Lisa "PalmOne Treo 650 Palm OS Smartphone: CDMA (Sprint) and GSM Versions" Dec. 10, 2004 Mobile Tech Review Document Available at: <http://web.archive.org/web/20050404004524/http://www.mobiletechreview.com/Treo_650.htm> Retrieved on May 21, 2013 6 Pages.

JSJSDesigns PLC "JS JS Products" Available at: <http://web.archive.org/web/20101111085355/http://www.jsjsdesigns.com/product.html> Nov. 11, 2010 4 pages.

Myers Dana "SimpleLink™ Wi-Fi® CC3000-First Time Config Using PC" Available at http://www.youtube.com/watch?v=10U4NTgkjLs retrieved on Aug. 13, 2013 Transcript of Video provided on CD Media Dec. 18, 2012 pp. 1-2.

Myers Dana "SimpleLink™ Wi-Fi® CC3000-First Time Config with Smartphone" Available at http://www.youtube.com/watch?v=fxP9hnZysgo Retrieved on Aug. 13, 2013 Transcript of Video provided on CD Media Sep. 19, 2012 pp. 1-2.

Rustybrick Inc. "iPhone 4 Morse Code Transmission App" Available at <http://www.rustybrick.com/iphone-morse-code.php> Jan. 4, 2011 3 pages.

Texas Instruments "CC3000 Smart Config" Available at http://processors.wiki.ti.com/index.php/CC3000_Smart_Config retrieved in Feb. 2, 2016 pp. 1-5.

U.S. Appl. No. 16/102,357, filed Aug. 13, 2018.
U.S. Appl. No. 16/030,310, filed Jul. 9, 2018.
U.S. Appl. No. 16/113,548, filed Aug. 27, 2018.
International Patent Application No. PCT/US2012/045067, International Search Report dated Oct. 29, 2012, 6 pages.
International Patent Application No. PCT/US2012/045114, International Search Report dated Oct. 24, 2012, 5 pages.
International Patent Application No. PCT/US2012/45096, International Search Report dated Apr. 2, 2013, 8 pages.

* cited by examiner

TWO-PART LOAD CONTROL SYSTEM MOUNTABLE TO A SINGLE ELECTRICAL WALLBOX

CROSS-REFERENCE TO RELATED APPLICATIONS

This application is a continuation of U.S. patent application Ser. No. 13/598,522, filed Aug. 29, 2012, entitled TWO-PART LOAD CONTROL SYSTEM MOUNTABLE TO A SINGLE ELECTRICAL WALLBOX, now U.S. Pat. No. 9,368,025, issued Jun. 14, 2016, which claims the benefit of commonly assigned Provisional U.S. Patent Application No. 61/528,492, filed on Aug. 29, 2011, entitled TWO-PART LOAD CONTROL SYSTEM MOUNTABLE TO A SINGLE ELECTRICAL WALLBOX, the disclosure of which is hereby incorporated by reference herein in its entirety.

This application is related to commonly assigned U.S. patent application Ser. No. 13/598,529, filed Aug. 29, 2012, entitled TWO-PART LOAD CONTROL SYSTEM MOUNTABLE TO A SINGLE ELECTRICAL WALLBOX, the disclosure of which is hereby incorporated by reference herein in its entirety.

BACKGROUND

Technical Field

Described herein are load control systems for controlling the amount of power that is delivered to an electrical load, such as a lighting load, for example. Such load control systems may be embodied in a two-part load control system that includes a load control device and a remote control device that may both be mounted to a single electrical wallbox.

Description of the Related Art

Some prior art load control devices may be configured to control an electrical load in response to direct communication from a remote control device. Such load control devices may be difficult to configure based on the location of the load control device after installation. For example, the load control device may be installed in a ceiling, behind a wall, or in another difficult-to-reach or remote location. In such prior art systems, the user needs to access the load control device by hand to configure the device to respond to communications from a remote control device. This, of course, is difficult, if not impossible, for the user when the load control device is located in a difficult-to-reach or remote location.

FIG. 1 depicts an example prior art load control system 100 having a load control device 106 that may be configured to control a load 104. The load control device 106 is adapted to be in electrical connection with an AC power source 102 and the load 104 for controlling the power delivered to the load 104. The load control device 106 may be associated with one or more remote control devices, such as a remote control 110, an occupancy sensor 112, a daylight sensor 114, or any other remote control device that is capable of controlling the load 104 through messages transmitted directly to the load control device 106.

In order to control the load 104 from one of the remote control devices, the load control device 106 may be configured to receive communications directly from that device. A button 108 on the load control device 106 may be used for configuring the load control system 100. The button 108 may be actuated, along with a button on the remote control device (e.g., button 116 on the remote control 110, button 118 on the daylight sensor 114, or button 120 on the occupancy sensor 112), to associate the remote control device with the load control device 106. Each associated remote control device may then be used to control the load via direct communication with the load control device 106.

FIG. 2 is a flow diagram illustrating a prior art method 200 for configuring the load control device 106 of the system 100. As shown in FIG. 2, the process 200 begins at 202. At 204, a user may actuate a button 108 on the load control device 106 for associating the load control device 106 with one of the remote control devices (e.g., the remote control 110). After actuation of the button 108 on the load control device 106, a button may be actuated on the remote control device (e.g., button 116 on the remote control 110) at 206. Actuation of the button at 206 causes the remote control device (e.g., the remote control 110) to be associated with the load control device 106 at 208. After the remote control device (e.g., the remote control 110) is associated with the load control device 106 at 208, the remote control device (e.g., the remote control 110) can be used, at 210, to control the load 104 via direct communication from the remote control device (e.g., the remote control 110) to the load control device 106.

If the user is done configuring remote control devices, at 212, for directly controlling the operation of the load control device 106, then the process 200 ends at 214. If the user is not done configuring remote control devices, at 212, and wishes to configure another remote control device (e.g., the daylight sensor 114 or the occupancy sensor 112) to directly control the operation of the load control device 106, the user may start the process 200 again at 202 using another remote control device (e.g., the daylight sensor 114 or the occupancy sensor 112).

In many installations, it may be desirable to install the load control device 106 in a hard-to-reach or remote location. For example, the load control device 106 may be mounted in the ceiling close to the lighting load 104 or in an electrical panel to minimize the electrical wiring that is needed. Accordingly, the load control device 106 may be installed such that the button 108 is difficult or impossible for the user to access. Typically, in such an installation, one or more remote control devices are associated with the load control device 106, and then the load control device 106 is installed in its permanent location. Consequently, subsequent association of additional remote control devices with the load control device 106, using the prior-art method 200 described above, may be difficult or impossible.

Accordingly, there is a need for a load control system that enables a user of the system to configure the load control device to operate with multiple remote control devices without having to access the load control device directly after the load control device is installed. It would be particularly desirable if the load control device and at least one of the remote control devices could be mounted to a single electrical wallbox. It would also be desirable if the load control device could provide power to operate the remote control device while both devices are mounted to the single electrical wallbox.

SUMMARY

A load control system is disclosed herein for controlling an amount of power delivered from an AC power source to an electrical load. For example, the load control system may include a load control device and a remote control device for controlling operation of the load control device. The load control device may be adapted to be coupled in series electrical connection between the AC power source and the electrical load for controlling the amount of power delivered to the electrical load. The load control device may include a first inductive coil. The remote control device may include a power supply and a second inductive coil. The remote control device may be configured to charge the power supply using energy derived from magnetic coupling between the first inductive coil and the second inductive coil. The remote control device may also be configured to communicate information to the load control device via the magnetic coupling between the first inductive coil and the second inductive coil.

According to another embodiment, the system may include a load control device and a remote control device for controlling an operation of the load control device. The load control device may include a first near-field communication (NFC) module and the load control device may include a second NFC module. The remote control device may be configured to communicate information to the load control device, as described herein, via transmission of NFC radio signals to the first NFC module.

DETAILED DESCRIPTION

Figure 1:
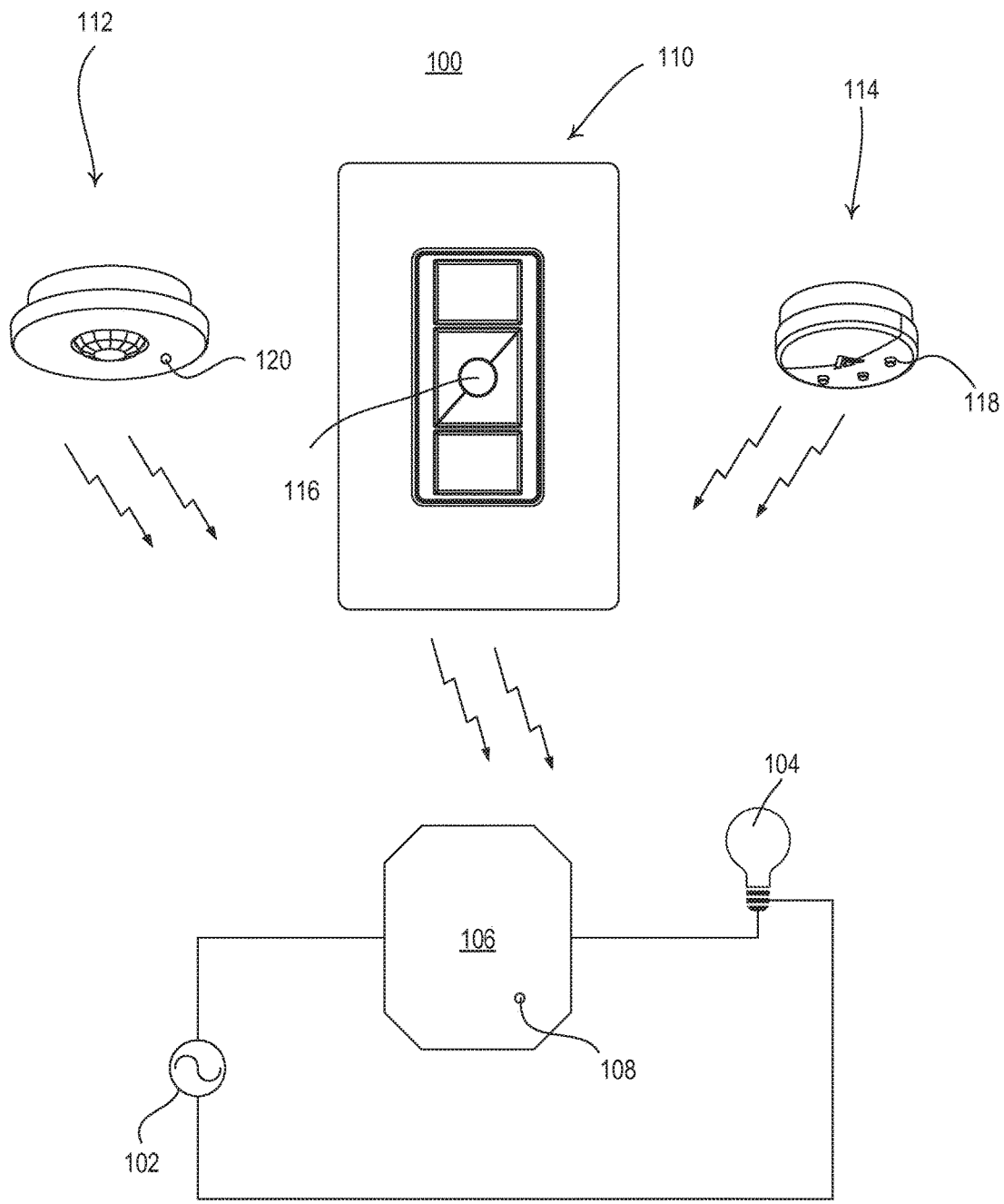
FIG. 1 depicts an example prior art load control system.
Figure 2:
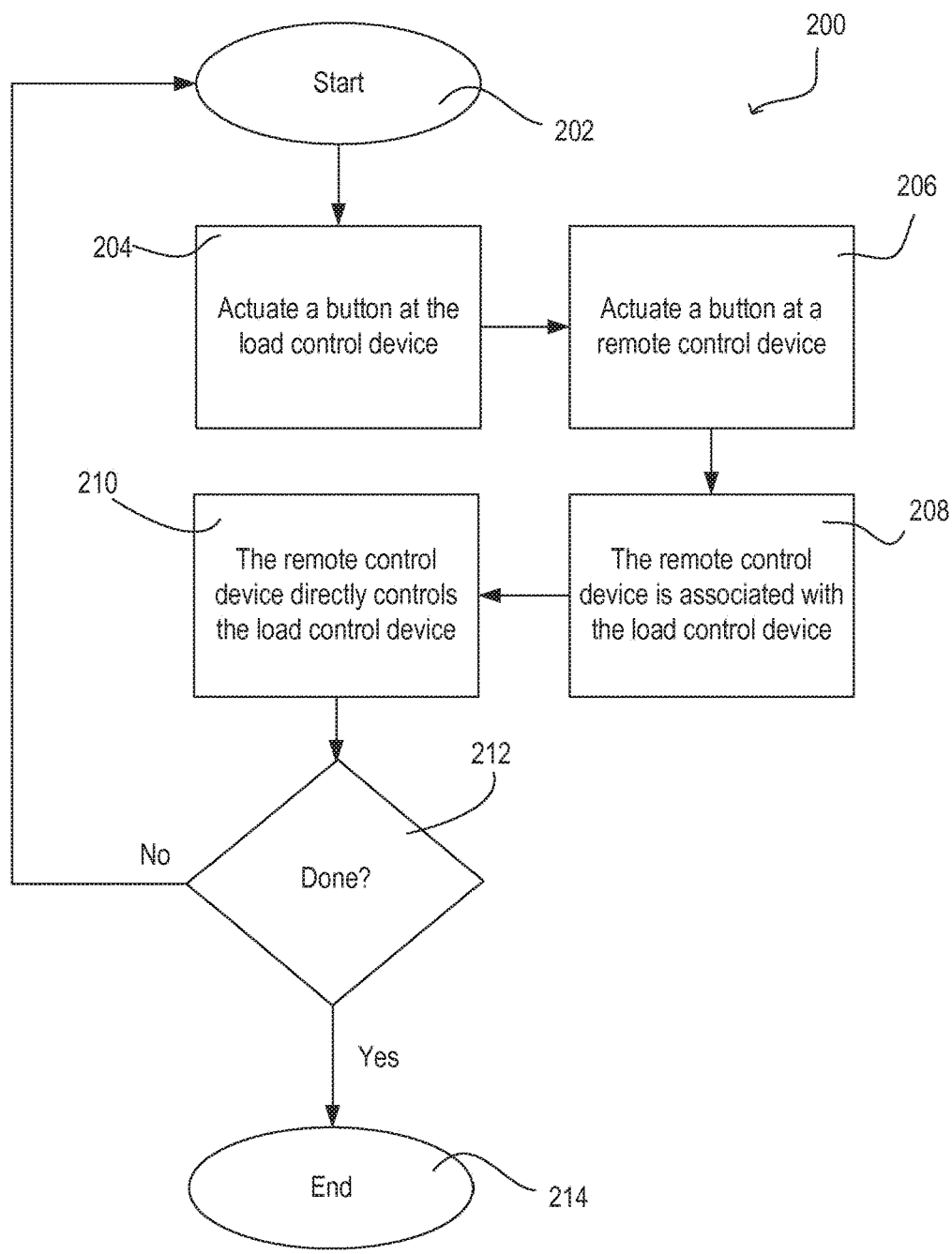
FIG. 2 is a flow diagram illustrating a prior art method for associating remote control devices with a load control device and controlling the load control device directly from each of the associated remote control devices.
Figure 3:
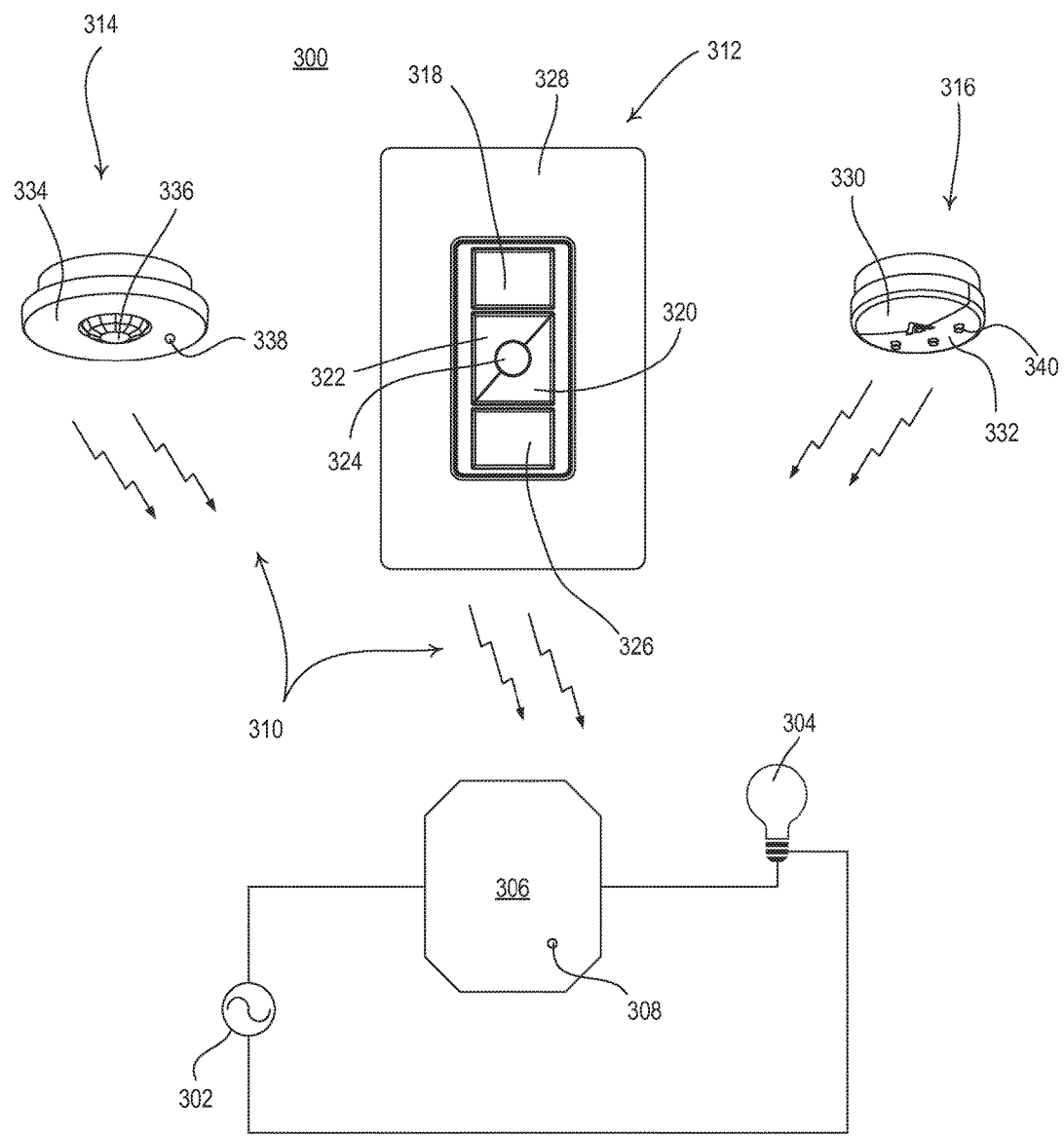
FIG. 3 depicts a first example embodiment of a load control system as disclosed herein.

FIG. 3 is an example embodiment of a load control system 300. The load control system 300 includes a load control device 306 that is adapted to be coupled in series electrical connection between an AC power source 302 and an electrical load 304 for controlling the power delivered to the electrical load 304. For example, the electrical load 304 may be a lighting load. The load control device 306 may include, for example, a relay adapted to be coupled in series electrical connection between the AC power source 302 and the electrical load 304 for turning the electrical load 304 on and off. Alternatively, the load control device 306 may include a dimming circuit for controlling the amount of power delivered to the electrical load 304 and thus the intensity of the electrical load 304.

The load control device 306 may be associated with one or more remote control devices, such as a remote control 312, an occupancy sensor 314, a daylight sensor 316, or any other remote control device that is capable of controlling the load 304 through transmission of digital messages to the load control device 306. The load control device 306 may include a radio-frequency (RF) communication circuit for receiving the digital messages via RF signals 310. The RF communication circuit may include an RF receiver or RF transceiver, for example, capable of receiving the digital messages via the RF signals 310. The load control device 306 is operable to control the electrical load 304 in response to the digital messages received via the RF signals 310. In addition, the load control device 306 includes a button 308 for use in configuring the load control system 300 as described herein.

The remote control 312 includes an on button 318, an off button 326, a raise button 322, a lower button 320, and a preset button 324 that, when actuated, may be used to control the load 304. The remote control 312 may be mounted in the opening of a faceplate 328 as shown in FIG. 3. The remote control 312 may include an RF communication circuit for transmitting the digital messages to the load control device 306 via the RF signals 310. The RF communication circuit may include an RF transmitter or RF transceiver, for example, capable of transmitting the digital messages via the RF signals 310. The remote control 312 is operable to transmit digital messages, via the RF communication circuit, to the load control device 306 in response to actuations of the buttons 318-326. The digital messages may be transmitted to directly associate the remote control 312 with the load control device 306. The digital messages may also include instructions/settings that may be interpreted by the load control device 306 for controlling the electrical load 304.

The load control system 300 may include other remote control devices for controlling the load 304 via the load control device 306, such as the occupancy sensor 314 and/or the daylight sensor 316, for example. In addition, the load control system 300 may include other types of input devices, such as, for example, vacancy sensors, temperature sensors, humidity sensors, security sensors, proximity sensors, keypads, key fobs, cell phones, smart phones, tablets, personal digital assistants, personal computers, timeclocks, audiovisual controls, and/or safety devices. In addition, the load control device 306 may be operable to receive the RF signals 310 from a central control transmitter, for example, for receiving a broadcast command, such as a timeclock command, a load shed command, or a demand response command. An example of a central control transmitter is described in greater detail in commonly-assigned U.S. Provisional Patent Application No. 61/654,562, filed Jun. 1, 2012, entitled LOAD CONTROL SYSTEM HAVING INDEPENDENTLY-CONTROLLED UNITS RESPONSIVE TO A BROADCAST TRANSMITTER, the entire disclosure of which is hereby incorporated by reference.

The occupancy sensor 314 and/or the daylight sensor 316 may be indirectly associated with the load control device 306 via the remote control 312. For example, after the remote control 312 is associated with the load control device 306, one or more of the buttons 318-326 on the remote control 312 may be actuated (e.g., by pressing and holding for a predetermined period of time) causing the remote control 312 to transmit a digital message to the load control device 306 for associating one or more other remote control devices (e.g., occupancy sensor 314 and/or daylight sensor 316) with the load control device 306. The digital message may cause the load control device 306 to automatically enter an association mode for associating with another remote control device (e.g., the occupancy sensor 314 or the daylight sensor 316).

The occupancy sensor 314 and the daylight sensor 316 are operable to transmit digital messages to the load control device 306, via the RF signals 310. The digital messages may be used for associating the remote control devices with the load control device 306 when the load control device 306 is in an association mode. The digital messages for associating the occupancy sensor 314 with the load control device 306 may be transmitted upon the actuation of button 338 (e.g., by pressing and holding button 338 for a predetermined period of time) on the occupancy sensor 314. The digital messages for associating the daylight sensor 316 may be transmitted upon the actuation of button 340 (e.g., by pressing and holding button 340 for a predetermined period of time) on the daylight sensor 316. Once the occupancy sensor 314 or the daylight sensor 316 has been associated with the load control device 306, the associated device (e.g., the occupancy sensor 314 or the daylight sensor 316) may transmit digital messages directly to the load control device 306 for controlling the operation of the load control device 306.

The occupancy sensor 314 may transmit digital messages for controlling the operation of the load control device 306 in response to detecting an occupancy condition (e.g., the presence of an occupant) or a vacancy condition (e.g., the absence of the occupant) in the vicinity of the occupancy sensor 314. The occupancy sensor 314 may be removably mountable to a ceiling or a wall in the space around the load control device 306 and/or the remote control 312. The occupancy sensor 314 may include an internal detector, e.g., a pyroelectric infrared (PIR) detector, which is housed in an enclosure 334, and may be operable to receive infrared energy from the occupant in the space via a lens 336 in the enclosure 334 to thus sense the occupancy condition in the vicinity of the occupancy sensor 314. The occupancy sensor 314 may process the output of the PIR detector to determine whether an occupancy condition or a vacancy condition is presently occurring in the space, for example, by comparing the output of the PIR detector to a predetermined occupancy voltage threshold. Alternatively, the internal detector may include an ultrasonic detector, a microwave detector, or any combination of PIR detectors, ultrasonic detectors, and/or microwave detectors. The occupancy sensor 314 may operate in an "occupied" state or a "vacant" state in response to the detections of occupancy or vacancy conditions, respectively, in the space. If the occupancy sensor 314 is in the vacant state and the occupancy sensor 314 determines that the space is occupied in response to the PIR detector, the occupancy sensor 314 may change to the occupied state.

Alternatively, the occupancy sensor 314 may be implemented as a vacancy sensor 314. The vacancy sensor 314 may operate to send digital messages to the load control device 306 to turn off the lighting load 304 when the vacancy sensor 314 detects a vacancy in the space. Therefore, when using vacancy sensors, the lighting load 304 may be turned on manually (e.g., in response to a manual actuation of the on button 318 of the remote control 312). Examples of RF load control systems having occupancy and vacancy sensors are described in greater detail in U.S. patent application Ser. No. 12/203,518, filed Sep. 3, 2008, and subsequently issued Aug. 30, 2011 as U.S. Pat. No. 8,009,042, entitled RADIO-FREQUENCY LIGHTING CONTROL SYSTEM WITH OCCUPANCY SENSING; U.S. patent application Ser. No. 12/203,500, filed Sep. 3, 2008, and subsequently issued May 10, 2011 as U.S. Pat. No. 7,940,167, entitled BATTERY-POWERED OCCUPANCY SENSOR; and U.S. patent application Ser. No. 12/371,027, filed Feb. 13, 2009, and subsequently issued Jun. 12, 2012 as U.S. Pat. No. 8,199,010, entitled METHOD AND APPARATUS FOR CONFIGURING A WIRELESS SENSOR, the entire disclosures of which are hereby incorporated by reference.

The daylight sensor 316 may be mounted so as to measure a total light intensity in the space around the daylight sensor 316 (e.g., in the vicinity of the lighting load 304 controlled by the load control device 306). The daylight sensor 316 may include an internal photosensitive circuit, e.g., a photosensitive diode, which may be housed in an enclosure 332 having a lens 330 for conducting light from outside the daylight sensor 316 towards the internal photosensitive diode. The daylight sensor 316 may be responsive to the total light intensity measured by the internal photosensitive circuit. Specifically, the daylight sensor 316 may be operable to wirelessly transmit digital messages (e.g., wireless signals) to the load control device 306 via the RF signals 310, such that the load control device 306 controls the present light intensity of the electrical load 304 in response to the total light intensity LT-SNSR measured by the daylight sensor 316. For example, the load control device 306 may control the present light intensity based on instructions/settings received in the digital messages. Examples of RF load control systems having daylight sensors are described in greater detail in U.S. patent application Ser. No. 12/727,956, filed Mar. 19, 2010, entitled WIRELESS BATTERY-POWERED DAYLIGHT SENSOR, and U.S. patent application Ser. No. 12/727,923, filed Mar. 19, 2010, entitled METHOD OF CALIBRATING A DAYLIGHT SENSOR, the entire disclosures of which are hereby incorporated by reference.

Figure 4:
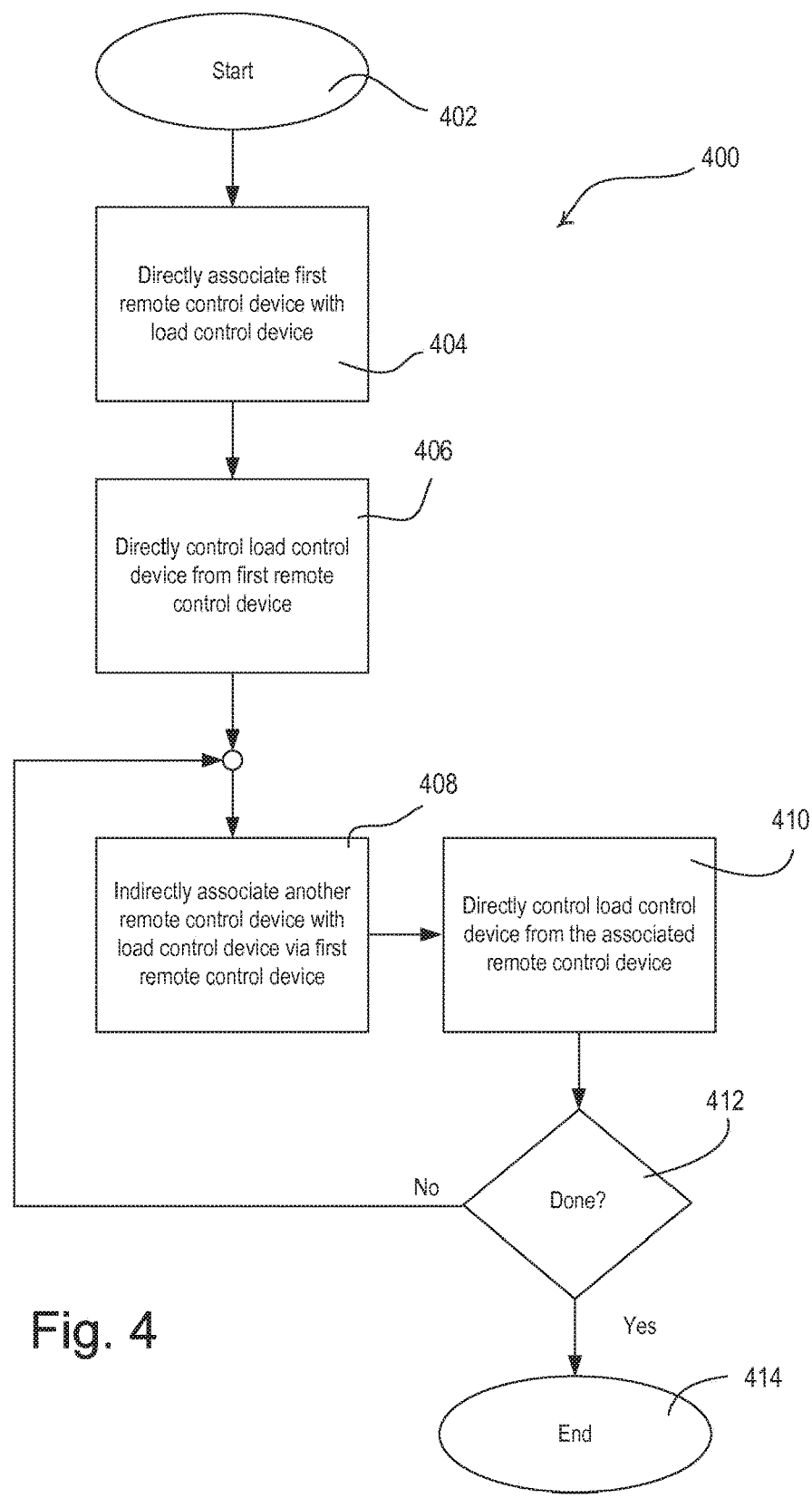
FIG. 4 is a flow diagram illustrating a first method as disclosed herein for associating remote control devices with a load control device and controlling the load control device directly from each of the associated remote control devices.

FIG. 4 is a flow diagram of a process 400 for associating remote control devices with the load control device 306 and controlling the load control device 306 via the associated remote control devices. As shown in FIG. 4, the process 400 begins at 402. At 404, a first remote control device (e.g., remote control 312) may be directly associated with the load control device 306. For example, a user may actuate a button 308 on the load control device 306 to cause the load control device 306 to enter an association mode. The button 308 may be actuated for a predetermined period of time (e.g., approximately 10 seconds) before the load control device 306 enters the association mode. While the load control device 306 is in the association mode, a user may actuate one or more buttons on the first remote control device (e.g., one or more of the predetermined buttons 318-326 on the remote control 312) to transmit an association message directly to the load control device 306 for associating the first remote control device (e.g., the remote control 312) with the load control device 306. The one or more buttons on the first remote control device (e.g., one or more of the predetermined buttons 318-326 on the remote control 312) may be actuated for a predetermined period of time (e.g., approximately 10 seconds) before transmitting the association message. The association message from the first remote control device (e.g., the remote control 312) may include a unique identifier (e.g., a serial number) of the first remote control device (e.g., the remote control 312). The load control device 306 may store the unique identifier (e.g., serial number) of the first remote control device (e.g., the remote control 312) in performing the association with the first remote control device (e.g., the remote control 312). The load control device 306 may then be responsive to digital messages containing the unique identifier (e.g., serial number) of the first remote control device (e.g., the remote control 312) with which the load control device 306 is associated.

As a result of the association of the first remote control device (e.g., the remote control 312), at 404, the first remote control device (e.g., the remote control 312) may be used to directly control the load control device 306 at 406. For example, the load control device 306 may be responsive to messages received from the first remote control device (e.g., the remote control 312) that contain instructions/settings for controlling the load 304. The messages may include the unique identifier (e.g., serial number) of the first remote control device (e.g., the remote control 312), which the load control device 306 may use to determine that the messages containing the instructions/settings are from the associated first remote control device (e.g., the remote control 312). The load control device 306 may execute received instructions/settings for controlling the load 304 if the instructions settings are received from an associated device.

In an example, the load control device 306 may be taken out of association mode to receive messages for controlling the load 304 and/or to control the load 304. The load control device 306 may be taken out of association mode automatically (e.g., at the expiration of a period of time or after an association is finished). Alternatively, the load control device may be taken out of association mode when a user actuates the button 308 on the load control device 306 and/or one or more of the buttons on the first remote control device (e.g., one or more of the predetermined buttons 318-326 on the remote control 312).

The associated first remote control device (e.g., the remote control 312) may be used to further configure and setup the load control system 300. For example, the first remote control device (e.g., the remote control 312) may operate as a master control for the load control device 306 to allow for configuration of the load control device 306, e.g., to allow for association of subsequent remote control devices with the load control device 306. A user may use the first remote control device (e.g., the remote control 312) to indirectly associate another remote control device (e.g., the occupancy sensor 314 or the daylight sensor 316) with the load control device 306, at 408. For example, the user may actuate one or more buttons on the first remote control device (e.g., one or more of the predetermined buttons 318-326 on the remote control 312) to transmit an association message to the load control device 306, causing the load control device 306 to automatically enter an association mode for associating with a second remote control device (e.g., the occupancy sensor 314 or the daylight sensor 316).

The association message transmitted from the first remote control device (e.g., the remote control 312) at 408 may include the unique identifier (e.g., serial number) of the first remote control device (e.g., the remote control 312). The load control device 306 may determine that it has already been associated with the first remote control device (e.g., the remote control 312) based on a comparison of the unique identifier received in the association message with the unique identifiers stored in the load control device 306. When the load control device 306 determines that it is already associated with the first remote control device (e.g., the remote control 312) identified in the association message from the first remote control device (e.g., the remote control 312), it may automatically enter the association mode for associating with the second remote control device (e.g., the occupancy sensor 314 or the daylight sensor 316).

While the load control device 306 is in the association mode, the user may actuate a button on the second remote control device (e.g., button 338 on the occupancy sensor 314 or button 340 on the daylight sensor 316), such that the second remote control device (e.g., the occupancy sensor 314 or the daylight sensor 316) transmits an association message directly to the load control device 306. The association message from the second remote control device (e.g., the occupancy sensor 314 or the daylight sensor 316) may include a respective unique identifier (e.g., a serial number) that may be stored by the load control device 306.

As a result of the association of the second remote control device (e.g., the occupancy sensor 314 or the daylight sensor 316) at 408, the user may directly control the load control device 306, at 410, using the associated second remote control device (e.g., the occupancy sensor 314 or the daylight sensor 316). For example, the load control device 306 may be responsive to messages received directly from the second remote control device (e.g., the occupancy sensor 314 or the daylight sensor 316). The messages may include instructions/settings for controlling the load 304. The messages may also include the unique identifier (e.g., serial number) of the second remote control device (e.g., the occupancy sensor 314 or the daylight sensor 316), which the load control device 306 may use to determine that the messages containing the instructions/settings for controlling the load 304 are received from the second remote control device (e.g., the occupancy sensor 314 or the daylight sensor 316). To enable the receipt of messages for controlling the load 304 and/or control of the load 304 at the load control device 306, the load control device 306 may be taken out of association mode as described herein.

The process 400 may be implemented to associate any number of remote control devices with the load control device 306. If the user is done associating remote control devices at 412, the process 400 ends at 414. If the user is not done associating remote control devices and wishes to associate another remote control device at 412, the process 400 may return to 408 and the user may associate another remote control device with the load control device 306 as described herein.

Alternatively, the load control device 306 may be operable to control other types of electrical loads. For example, the load control device 306 may alternatively comprise an electronic dimming ballast for driving a fluorescent lamp; a light-emitting diode (LED) driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a TV or computer monitor; an electric charger, such as an electric vehicle charger; and an alternative energy controller (e.g., a solar, wind, or thermal energy controller).

Figure 5A:
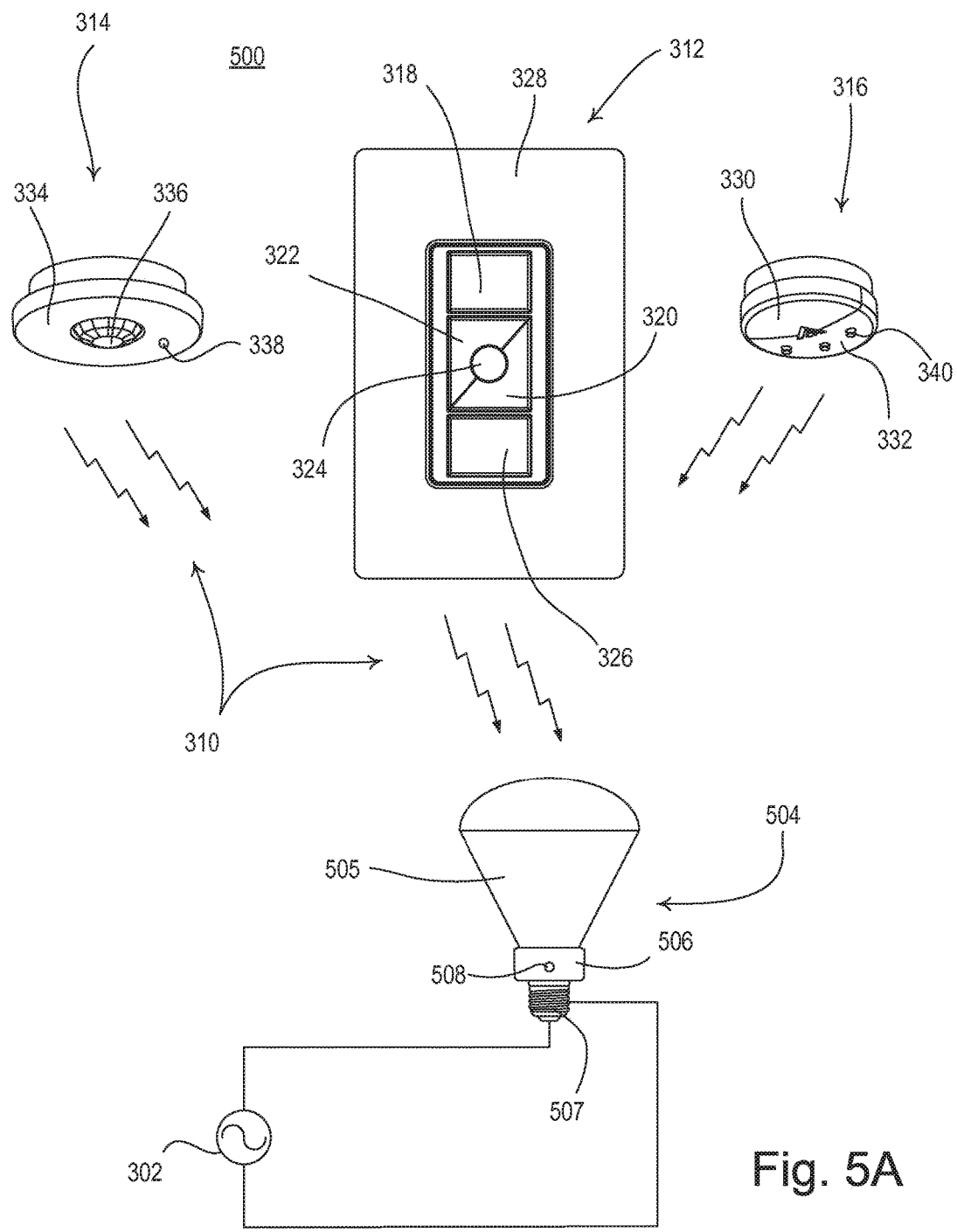
FIG. 5A depicts an alternate example embodiment of a load control system disclosed herein.

FIG. 5A illustrates an example embodiment of a load control system 500 comprising a screw-in controllable luminaire 504 powered by the AC power source 302. The screw-in controllable luminaire 504 comprises an integral light source 505, i.e., a lighting load, such as a compact fluorescent lamp or a light-emitting diode (LED) light engine, and a base portion 506 housing an integral load control circuit (not shown) for controlling the intensity of the light source. The base portion 506 is coupled to a screw-in base 507 that may be adapted to be screwed into a standard Edison socket, such that the load control circuit may be coupled to the AC power source 302. Examples of screw-in luminaires are described in greater detail in commonly-assigned U.S. Pat. No. 8,008,866, issued Aug. 30, 2011, entitled HYBRID LIGHT SOURCE, and U.S. patent application Ser. No. 13/464,330, filed May 4, 2012, entitled DIMMABLE SCREW-IN COMPACT FLUORESCENT LAMP HAVING INTEGRAL ELECTRONIC BALLAST CIRCUIT, the entire disclosures of which are hereby incorporated by reference.

The screw-in controllable luminaire 504 may be operable to receive the RF signals 310 from the remote control 312, the occupancy sensor 314, and/or the daylight sensor 316 for controlling the light source 505. The screw-in controllable luminaire 504 also comprises a button 508 for use in associating remote control devices. For example, the button 508 may be used in associating the remote control 312 with the screw-in controllable luminaire (e.g., in a similar manner as the remote control 312 is associated with the load control device 306 as described herein). The occupancy sensor 314 and/or the daylight sensor 316 may then be indirectly associated with the screw-in controllable luminaire 504 using the remote control 312 (e.g., in a similar manner as the occupancy sensor 314 and the daylight sensor 316 are indirectly associated with the load control device 306 as described herein).

Figure 5B:
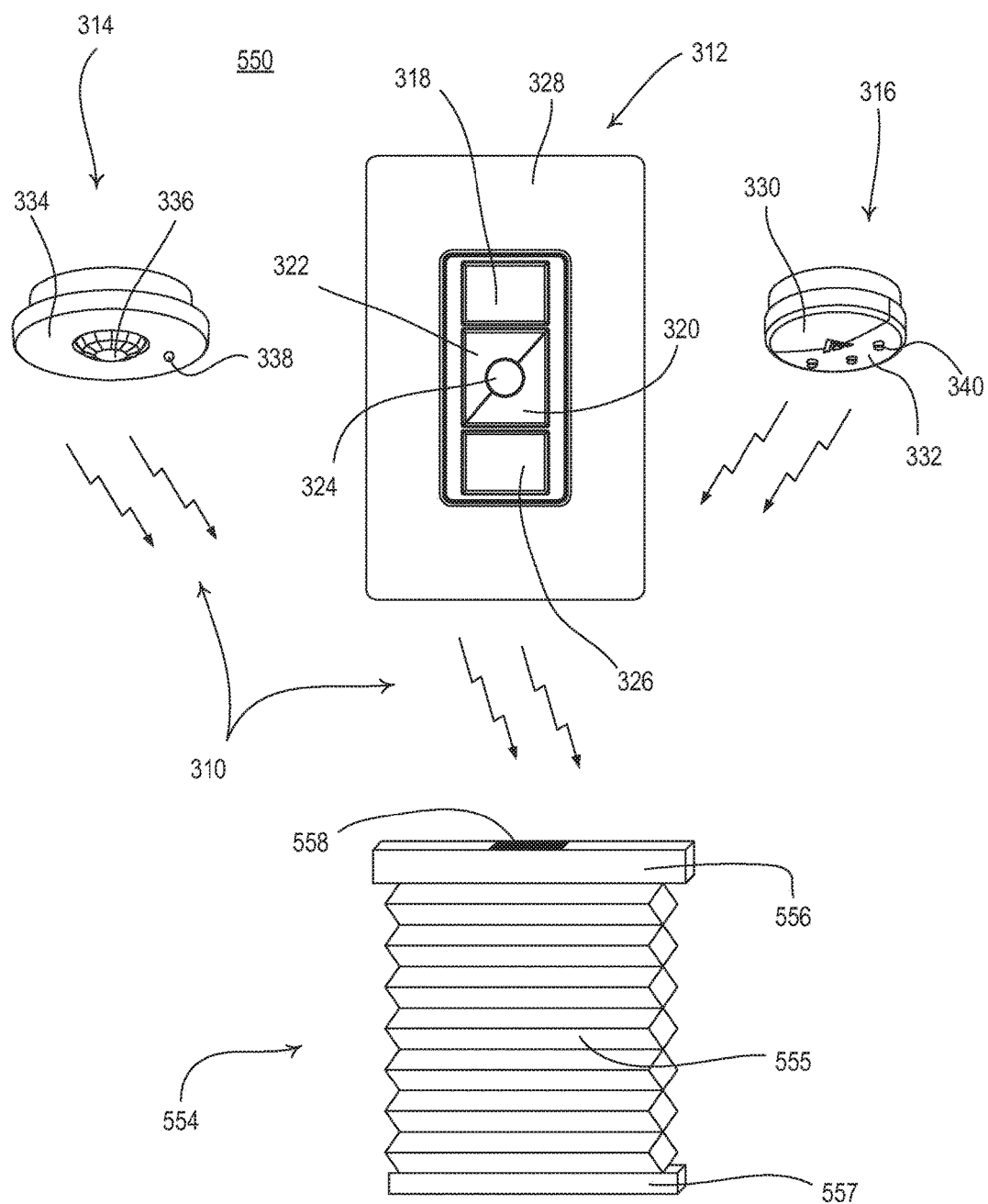
FIG. 5B depicts another alternate example embodiment of a load control system disclosed herein.

FIG. 5B illustrates an example embodiment of a load control system 550 comprising a motorized window treatment, for example, a battery-powered motorized window treatment 554. The battery-powered motorized window treatment 554 comprises a covering material, for example, a cellular shade fabric 555 as shown in FIG. 5B. The cellular shade fabric 555 may have a top end connected to a headrail 556 and a bottom end connected to a weighting element 557 and may be able to hang in front of a window. Alternatively, the battery-powered motorized window treatment 554 may comprise other types of covering materials, such as, for example, a plurality of horizontally-extending slats (e.g., a Venetian or Persian blind system), pleated blinds, a roller shade fabric, a Roman shade fabric, or a drapery fabric. The motorized window treatment 554 may further comprise a motor drive unit 558 for adjusting the cellular shade fabric 555 between a fully-open position $P_{FULLY\text{-}OPEN}$ and a fully-closed position $P_{FULLY\text{-}CLOSED}$ to control the amount of daylight entering a room or space. The motorized window treatment 554 may comprise one or more batteries (not shown) for powering the motor drive unit 558. Alternatively, the motor drive unit 558 may be powered from an external DC power source or an AC power source. Examples of battery-powered motorized window treatments are described in greater detail in commonly-assigned U.S. patent application Ser. No. 13/415,084, filed Mar. 8, 2012, entitled MOTORIZED WINDOW TREATMENT, the entire disclosure of which is hereby incorporated by reference.

The motorized window treatment 554 may be operable to receive the RF signals 310 from remote control devices for controlling the position of the cellular shade fabric 555. For example, the motorized window treatment 554 may receive the RF signals 310 the remote control 312, the occupancy sensor 314, and/or the daylight sensor 316. The motor drive unit 558 may comprise a button (not shown) for use in associating the remote control devices with the motorized window treatment 554. For example, the button on the motor drive unit 558 may be used to associate the remote control 312 with the motorized window treatment 554 (e.g., in a similar manner as the remote control 312 is associated with the load control device 306 as described herein). The occupancy sensor 314 and/or the daylight sensor 316 may then be indirectly associated with the motorized window treatment 554 using the remote control 312 (e.g., in a similar manner as the occupancy sensor 314 and the daylight sensor 316 are indirectly associated with the load control device 306 as described herein).

Figure 6:
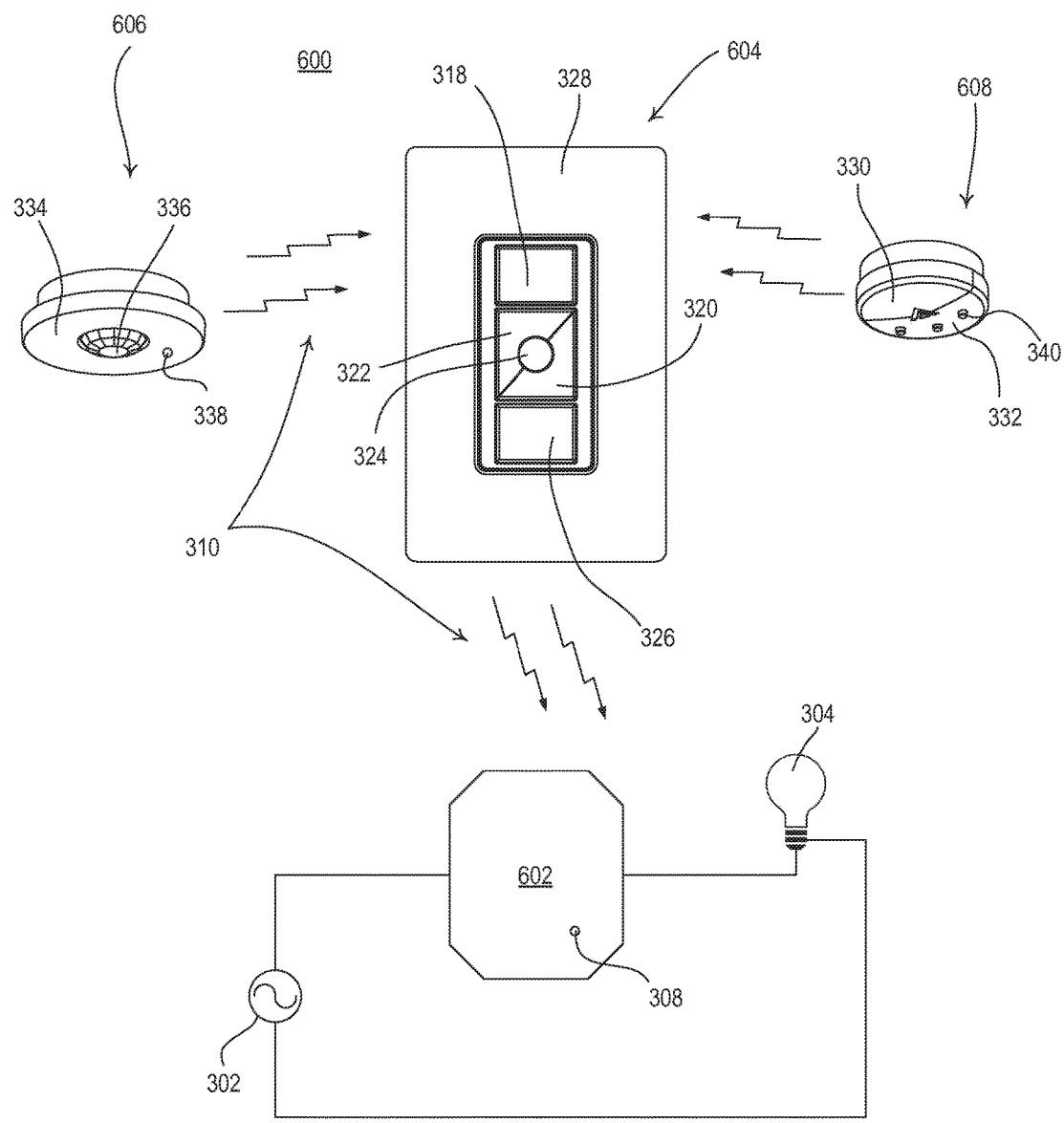
FIG. 6 depicts a second example embodiment of a load control system disclosed herein

FIG. 6 illustrates an example embodiment of a load control system 600. The load control system 600 includes a load control device 602 that may be associated with a remote control 604. The remote control 604 is capable of controlling the load 304 via digital messages transmitted directly to the load control device 602. The load control system 600 may also include one or more other remote control devices, such as the occupancy sensor 606 and/or the daylight sensor 608 for example, that may communicate with the load control device 602 indirectly via the remote control 604. For example, the occupancy sensor and/or the daylight sensor 608 may be indirectly associated with and/or indirectly control the operations of the load control device 602 via the remote control 604.

The load control device 602 may include a radio-frequency (RF) communication circuit for receiving digital messages via RF signals 310 from the remote control 604.

The RF communication circuit may include an RF receiver or RF transceiver, for example, capable of receiving the digital messages via the RF signals 310. The digital messages from the remote control 604 may include association messages for directly associating the remote control 604 or indirectly associating another remote control device (e.g., the occupancy sensor 606 or the daylight sensor 608). The digital messages from the remote control 604 may also include instructions/settings for controlling the load 304 via the load control device 602. The instructions/settings included in the digital messages may originate directly from the remote control 604 or from another associated remote control device (e.g., the occupancy sensor 606 or the daylight sensor 608). The load control device 602 is operable to control the electrical load 304 in response to the instructions/settings included in the received digital messages.

The remote control 604 includes an RF communication circuit for receiving digital messages from other remote control devices (e.g., the occupancy sensor 606 or the daylight sensor 608) and transmitting digital messages to the load control device 602 via the RF signals 310. The RF communication circuit may include an RF transceiver, for example, capable of transmitting and/or receiving the digital messages via the RF signals 310. Specifically, the remote control 604 is operable to receive digital messages including association information for another remote control device (e.g., the occupancy sensor 606 or the daylight sensor 608) and to transmit the association information to the load control device 602 to associate the other remote control device (e.g., the occupancy sensor 606 or the daylight sensor 608). The remote control 604 may also receive digital messages from another remote control device (e.g., the occupancy sensor 606 or the daylight sensor 608) that include instructions/settings for controlling the electrical load 304 and transmit digital messages including the received instructions/settings to the load control device 602 for controlling the electrical load 304.

As shown in FIG. 6, the system 600 includes other remote control devices, such as the occupancy sensor 606 and the daylight sensor 608, that are capable of indirectly associating with and/or indirectly controlling the operation of the load control device 602, via the remote control 604. The occupancy sensor 606 and the daylight sensor 608 may each use the associated remote control 604 to indirectly communicate digital messages to the load control device 602. The occupancy sensor 606 and the daylight sensor 608 are operable to transmit digital messages to the remote control 604 via the RF signals 310. The digital messages transmitted from the occupancy sensor 606 or the daylight sensor 608 may include respective association information for associating each device with the load control device 602. The association information may include the unique identifier (e.g., serial number) of the respective device. The digital messages transmitted from the occupancy sensor 606 or the daylight sensor 608 may include respective instructions/settings for controlling the electrical load 304 via the load control device 602. The digital messages transmitted by the occupancy sensor 606 or the daylight sensor 608 may be received by the remote control 604 and the information in the messages may be forwarded to the load control device 602.

Figure 7:
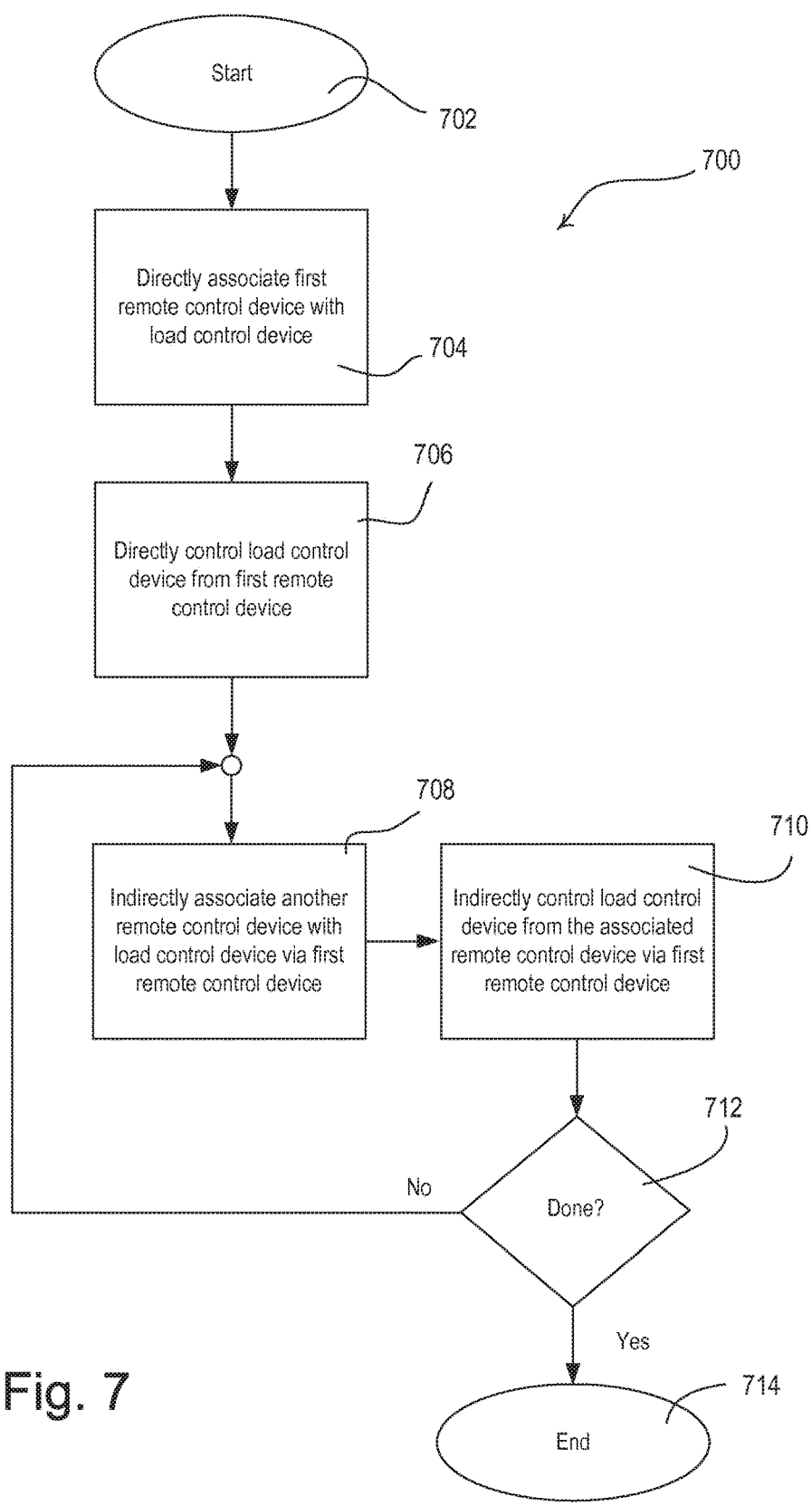
FIG. 7 is a flow diagram illustrating a second method as disclosed herein for indirectly associating remote control devices with a load control device and indirectly controlling the load control device from the associated remote control devices.

FIG. 7 is a flow diagram of a process 700 for associating remote control devices with the load control device 602 and controlling the load control device 602 using the associated remote control devices. As shown in FIG. 7, the process 700 begins at 702. At 704, a first remote control device (e.g., the remote control 604) may be directly associated with the load control device 602. As a result of the association of the first remote control device (e.g., the remote control 604), at 704, the first remote control device (e.g., the remote control 604) may be used to directly control the load control device 602, at 706.

The associated first remote control device (e.g., the remote control 604) may be used to indirectly associate another remote control device (e.g., the occupancy sensor 606 or the daylight sensor 608) with the load control device 602, at 708. For example, the user may actuate one or more buttons on the first remote control device (e.g., one or more of the predetermined buttons 318-326 on the remote control 604) to transmit an association message to the load control device 602, causing the load control device 602 to automatically enter an association mode. While the load control device 602 is in the association mode, the user may actuate a button on a second remote control device (e.g., button 338 on the occupancy sensor 606 or button 340 on the daylight sensor 608), such that the second remote control device (e.g., the occupancy sensor 606 or the daylight sensor 608) transmits association information to the load control device 602 indirectly via the first remote control device (e.g., the remote control 604).

As a result of the association of the second remote control device (e.g., the occupancy sensor 606 or the daylight sensor 608), at 708, instructions/settings from the second remote control device (e.g., the occupancy sensor 606 or the daylight sensor 608) may be used by the load control device 602 for controlling the load 304. Thus, the second remote control device (e.g., the occupancy sensor 606 or the daylight sensor 608) may be used to indirectly control the load control device 602 via the first remote control device (e.g., the remote control 604), at 710. For example, the first remote control device (e.g., the remote control 604) may receive instructions/settings for controlling the load 304 from the second remote control device (e.g., the occupancy sensor 606 or the daylight sensor 608) and the first remote control device (e.g., the remote control 604) may forward the instructions/settings to the load control device 602. The load control device 602 may be responsive to messages received directly from the first remote control device (e.g., the remote control 604) that contain instructions/settings for controlling the load 304 from the second remote control device (e.g., the occupancy sensor 606 or the daylight sensor 608). The messages that include the instructions/settings for controlling the load 304 may also include the unique identifier (e.g., serial number) of the first remote control device (e.g., the remote control 604) from which the message is sent and/or the unique identifier (e.g., serial number) of the second remote control device (e.g., the occupancy sensor 606 or the daylight sensor 608) from which the instructions/settings originated. The load control device 602 may use the received unique identifier(s) to determine that the instructions/settings for controlling the load 304 are received from an associated remote control device.

The process 700 may be implemented to associate any number of remote control devices with the load control device 602. If the user is done associating remote control devices at 712, the process 700 ends at 714. If the user is not done associating remote control devices and wishes to associate another remote control device at 712, the process 700 may return to 708 and the user may associate another remote control device with the load control device 602 as described herein.

In an alternative embodiment, the second remote control device need not be associated with the load control device 602, as illustrated at 708, for example. Instead, the second remote control device may transmit instructions/setting for controlling the load 304 to the first remote control device and, because the first remote control device is already associated with the load control device 602, the first remote control device may forward the instructions/settings on as if they originated at the first remote control device. For example, the instructions/settings may be transmitted from the first remote control device in a message that includes the unique identifier (e.g., serial number) of the first remote control device.

Figure 8:
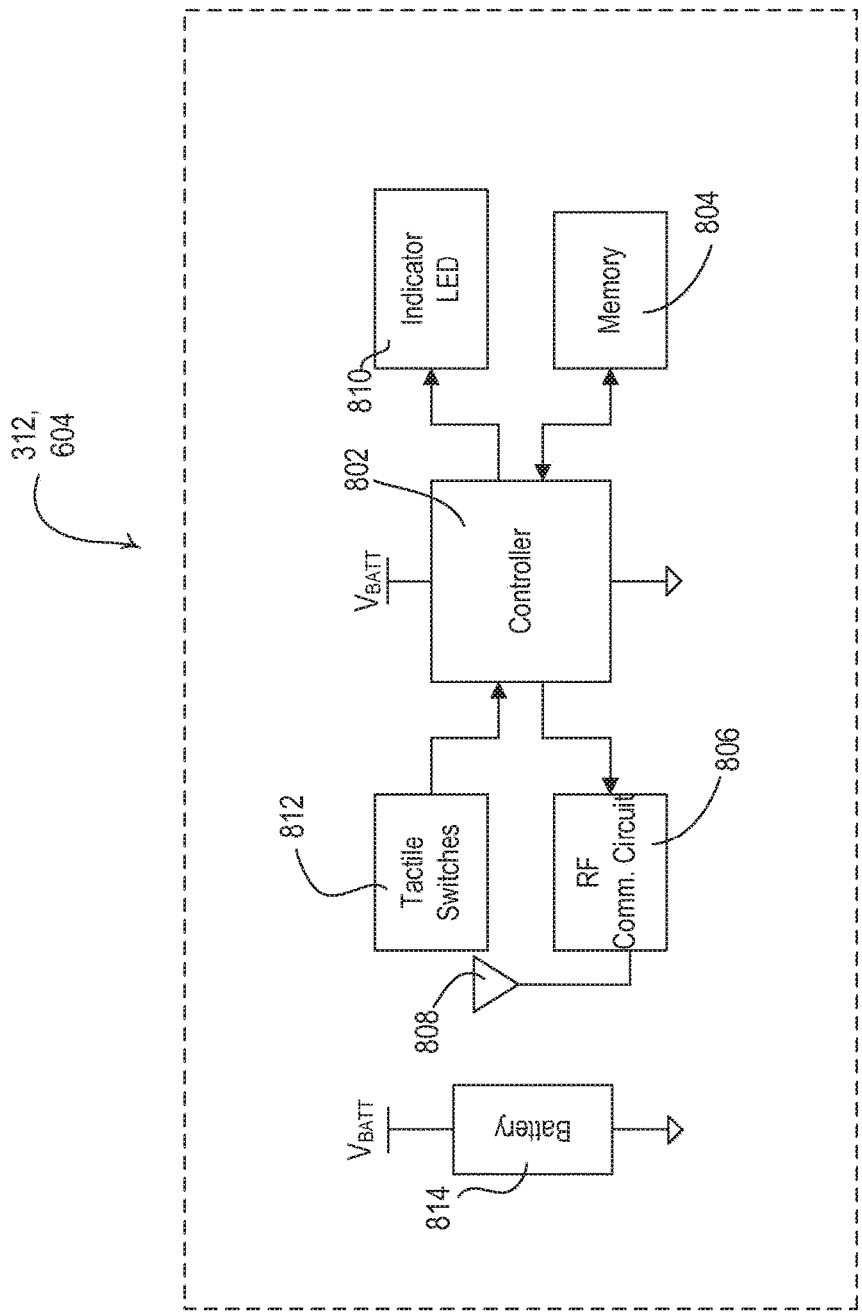
FIG. 8 is a functional block diagram of an example embodiment of a remote control device as disclosed herein.

FIG. 8 is a functional block diagram of an example embodiment of the remote control 312, 604 disclosed herein. The remote control 312, 604 includes a controller 802 for controlling the operation of the remote control 312, 604. The controller 802 may include a microcontroller, a programmable logic device (PLD), a microprocessor, an application specific integrated circuit (ASIC), a field-programmable gate array (FPGA), or any suitable processing device or control circuit. The controller 802 may receive inputs from the tactile switches 812 that are mounted on a printed circuit board (not shown) of the remote control 312, 604 for controlling the electrical load 304. For example the tactile switches 812 may include the buttons 318-326. The controller 802 may determine one or more instructions/settings for transmitting via the RF communication circuit 806 based on the inputs received from the tactile switches 812.

The controller 802 may also control light-emitting diodes 810, which may be mounted on the printed circuit board. The light emitting diodes 810 may be arranged to illuminate status indicators on the front surface of the remote control 312, 604, for example, through a light pipe structure (not shown). The controller 802 may also be coupled to a memory 804 for storage and/or retrieval of unique identifiers (e.g., serial numbers) of the remote control 312, 604, instructions/settings for controlling the electrical load 304, programming instructions for communicating via a wireless communication link, and/or the like. The memory 804 may be implemented as an external integrated circuit (IC) or as an internal circuit of the controller 802. A battery 814, or other power supply for example, may generate a direct-current (DC) voltage $V_{BATT}$ for powering the controller 802, the memory 804, and other low-voltage circuitry of the remote control 312, 604.

The remote control 312, 604 further includes an RF communication circuit 806 for transmitting and/or receiving the RF signals 310. The RF communication circuit 806 may include an RF transmitter, an RF receiver, and/or an RF transceiver, for example. In an example, the RF communication circuit 806 may be used to receive RF signals 310 from another remote control device and/or transmit RF signals 310 to the load control device 306, 602. The RF communication circuit 806 may be configured to communicate via a Wi-Fi communication link, a Wi-MAX communication link, RF signals according to a proprietary RF communication protocol (e.g., Clear Connect™ protocol), and/or a Bluetooth® communication link. The RF communication circuit 806 may receive instructions/setting from the controller 802 and may transmit the instructions/settings, via the RF antenna 808.

The controller 802 may be capable of receiving and processing messages from the RF communication circuit 806. The controller 802 may also be capable of processing messages and sending them to the RF communication circuit 806 for transmission. Information in the messages received by the controller 802 from the RF communication circuit 806 may be stored in the memory 804. For example, the controller 802 may store association information and/or instructions/settings received from another remote control device in the memory 804 and may access the stored association information and/or instructions/settings for transmitting them to the load control device 306, 602 via the RF communication circuit 806.

Figure 9:
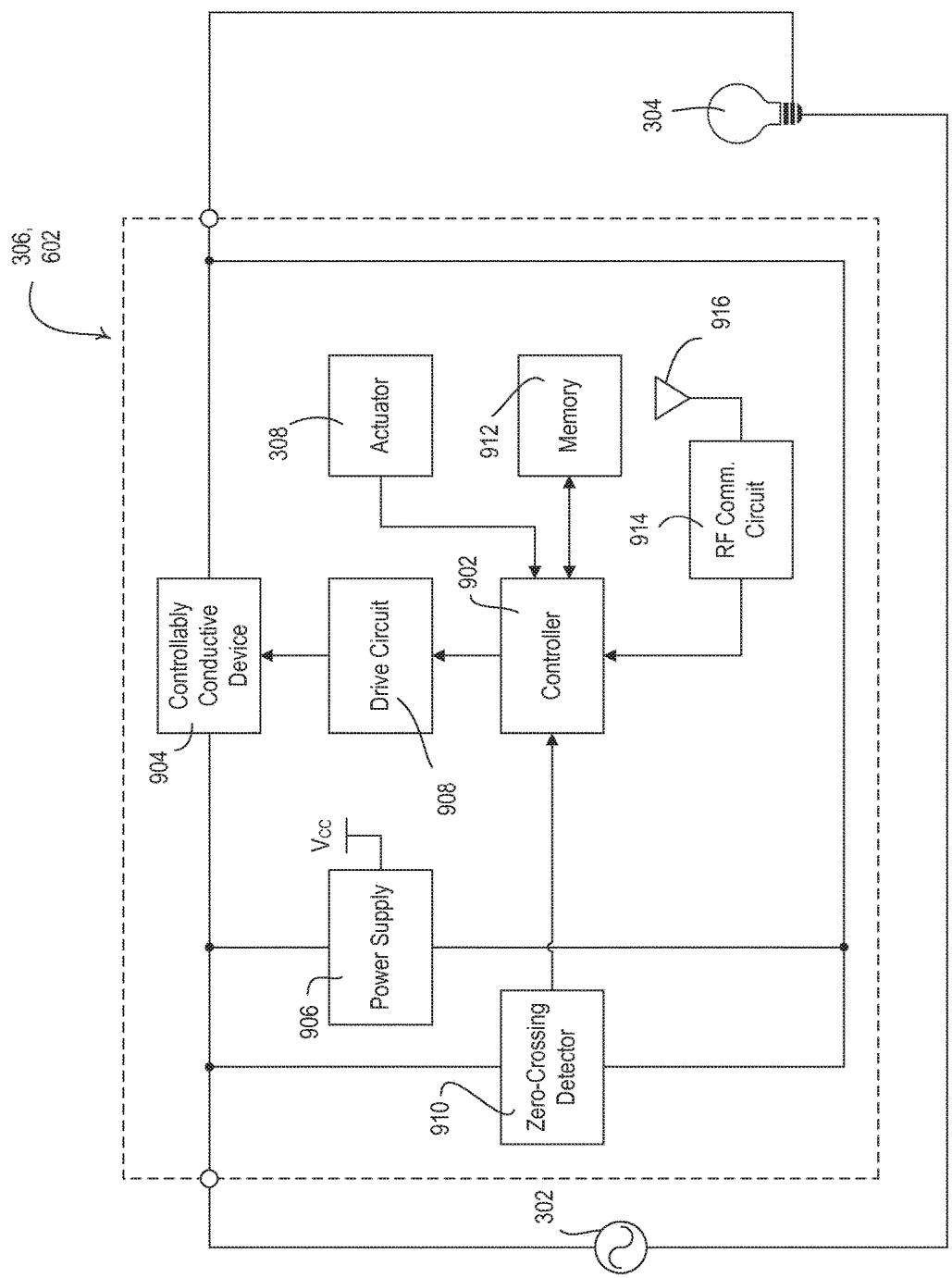
FIG. 9 is a functional block diagram of an example embodiment of a load control device as disclosed herein.

FIG. 9 is a functional block diagram of the load control device 306, 602 as disclosed herein. The load control device 306, 602 may include a controllably conductive device 904 coupled in series electrical connection between the AC power source 302 and the electrical load 304 for control of the power delivered to the electrical load 304. The controllably conductive device 904 may include a relay or other switching device, or any suitable type of bidirectional semiconductor switch, such as, for example, a triac, a field-effect transistor (FET) in a rectifier bridge, or two FETs in anti-series connection. The controllably conductive device 904 may include a control input coupled to a drive circuit 908.

The load control device 306, 602 may further include a controller 902 coupled to the drive circuit 908 for rendering the controllably conductive device 904 conductive or non-conductive to thus control the power delivered to the electrical load 304. The controller 902 may include a microcontroller, a programmable logic device (PLD), a microprocessor, an application specific integrated circuit (ASIC), a field-programmable gate array (FPGA), or any suitable processing device or control circuit. A zero-crossing detector 910 may determine the zero-crossings of the input AC waveform from the AC power supply 302. A zero-crossing may be the time at which the AC supply voltage transitions from positive to negative polarity, or from negative to positive polarity, at the beginning of each half-cycle. The controller 902 may receive the zero-crossing information from the zero-crossing detector 910 and may provide the control inputs to the drive circuit 908 to render the controllably conductive device 904 conductive and non-conductive at predetermined times relative to the zero-crossing points of the AC waveform.

The controller 902 may receive inputs from a mechanical actuator 308 (e.g., button, switch, etc.) that is mounted on a printed circuit board (not shown) of the load control device 306, 602. The controller 902 may also be coupled to a memory 912 for storage and/or retrieval of unique identifiers (e.g., serial numbers) of remote control devices, instructions/settings for controlling the electrical load 304, programming instructions for communicating via a wireless communication link, and/or the like. The memory 912 may be implemented as an external integrated circuit (IC) or as an internal circuit of the controller 902. A power supply 906 may generate a direct-current (DC) voltage Vcc for powering the controller 902, the memory 912, and other low-voltage circuitry of the load control device 306, 602.

The load control device 306, 602 may further include an RF communication circuit 914 coupled to an antenna 916 for communicating via the RF signals 310. The RF communication circuit 914 may include an RF receiver capable of simply receiving the RF signals 310, and/or an RF transceiver capable of transmitting and/or receiving RF signals 310, for example. The RF communication circuit 914 may be configured to communicate via a Wi-Fi communication link, a Wi-MAX communication link, RF signals according to a proprietary RF communication protocol (e.g., Clear Connect™ protocol), and/or a Bluetooth® communication link. The RF communication circuit 914 may transmit and/or receive the RF signals 310 via the antenna 916. Examples of antennas for wall-mounted load control devices are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

Figure 10:
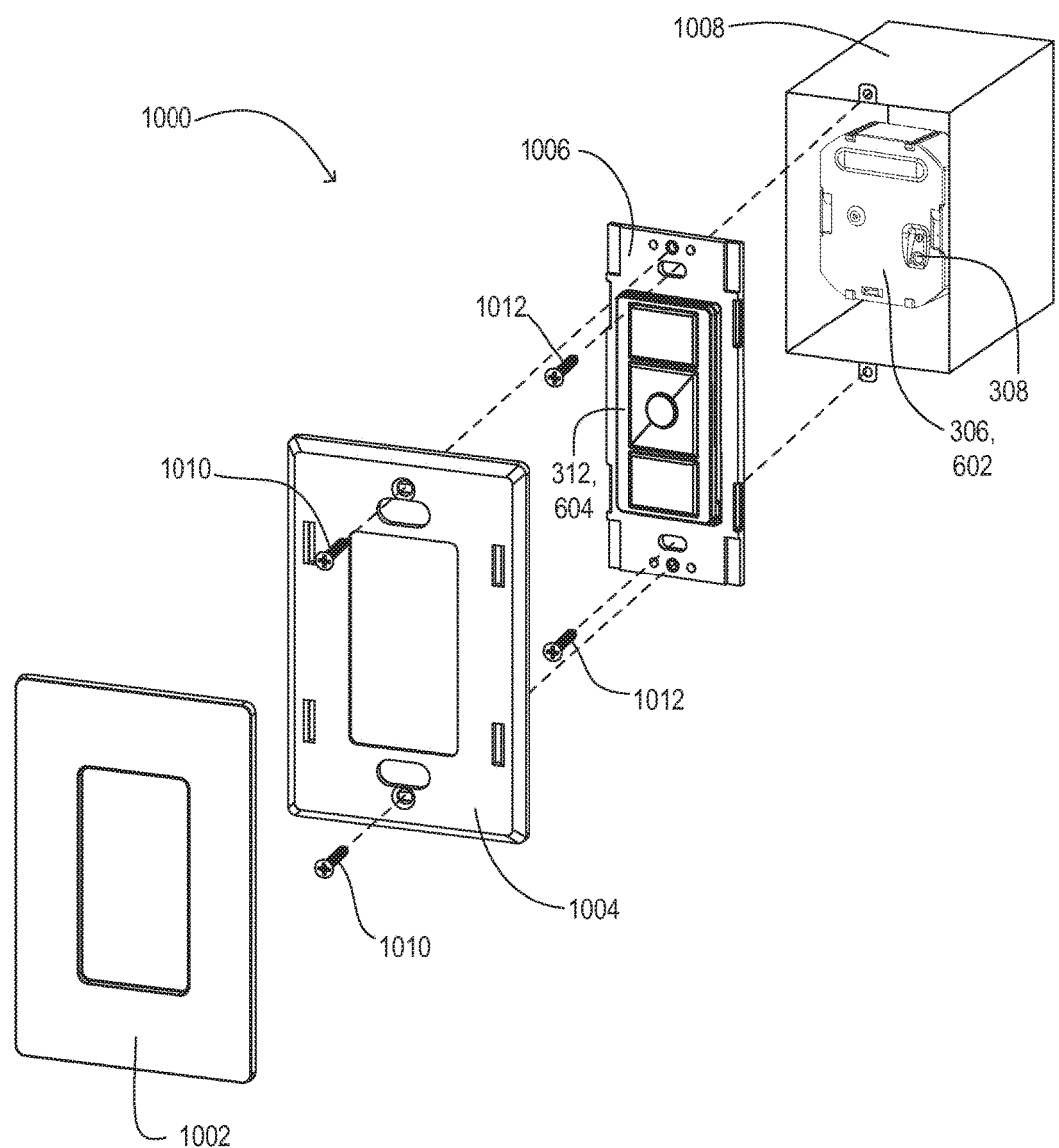
FIG. 10 is an exploded perspective view of an in-wall load control device and remote control device showing how the in-wall load control device and the remote control device may both be mounted to a single electrical wallbox.

FIG. 10 is a perspective view of the load control device 306, 602 and the remote control 312, 604 being mounted to a single electrical wallbox 1008. The load control device 306, 602 may be adapted to be located inside the wallbox 1008, and thus may be referred to as an in-wall load control device 306, 602. The remote control 312, 604 may be coupled to a mounting structure 1006 that may be attached to the wallbox 1008 via mounting screws 1012, such that the remote control 312, 604 may be located outside the wallbox 1008. The faceplate 1002 may be adapted to snap to a faceplate adapter 1004, which may be connected to the mounting structure 1006 via faceplate screws 1010.

Before the remote control 312, 604 and the mounting structure 1006 are mounted to the wallbox 1008, for example, during installation of the load control system 300, 600, the remote control 312, 604 may be associated with the in-wall load control device 306, 602 as described herein. For example, a user may actuate the button 308 on the in-wall load control device 306, 602 to cause the in-wall load control device 306, 602 to enter an association mode. While the in-wall load control device 306, 602 is in the association mode, the user may actuate a predetermined one or more of the buttons 318-326 of the remote control 312, 604, such that the remote control 312, 604 transmits an association message to the in-wall load control device 306, 602. The in-wall load control device 306, 602 may use the information in the association message to associate the remote control 312, 604 with the in-wall load control device 306, 602. For example, the association message may include a unique identifier (e.g., a serial number) of the remote control 312, 604, which the in-wall load control device 306, 602 may store for association. Each digital message transmitted by the remote control 312, 604 for controlling operation of the in-wall load control device 306, 602 may include the unique identifier (e.g., serial number) of the remote control 312, 604. After association, the in-wall load control device 306, 602 may be responsive to messages containing the unique identifier (e.g., serial number) of the remote control 312, 604.

After the remote control 312, 604 is associated with the in-wall load control device 306, 602, the remote control 312, 604 and the mounting structure 1006 may be mounted to the wallbox 1008 and the user may actuate one or more of the buttons 318-326 of the remote control 312, 604 to further configure the load control system 300, 600 as described herein. In other words, the remote control 312, 604 may operate as a master control for the in-wall load control device 306, 602 to allow for configuration of the in-wall load control device 306, 602 while the in-wall load control device 306, 602 is installed in the wallbox 1008 and may be inaccessible to the user.

Rather than being installed in the electrical wallbox 1008, the in-wall load control device 306, 602 could alternatively be installed in an electrical closet, or mounted to a junction box, above a ceiling, or flush to a wall. In addition, the remote control 312, 604 could be mounted flush to a wall or implemented as a tabletop or handheld device.

Figure 11:
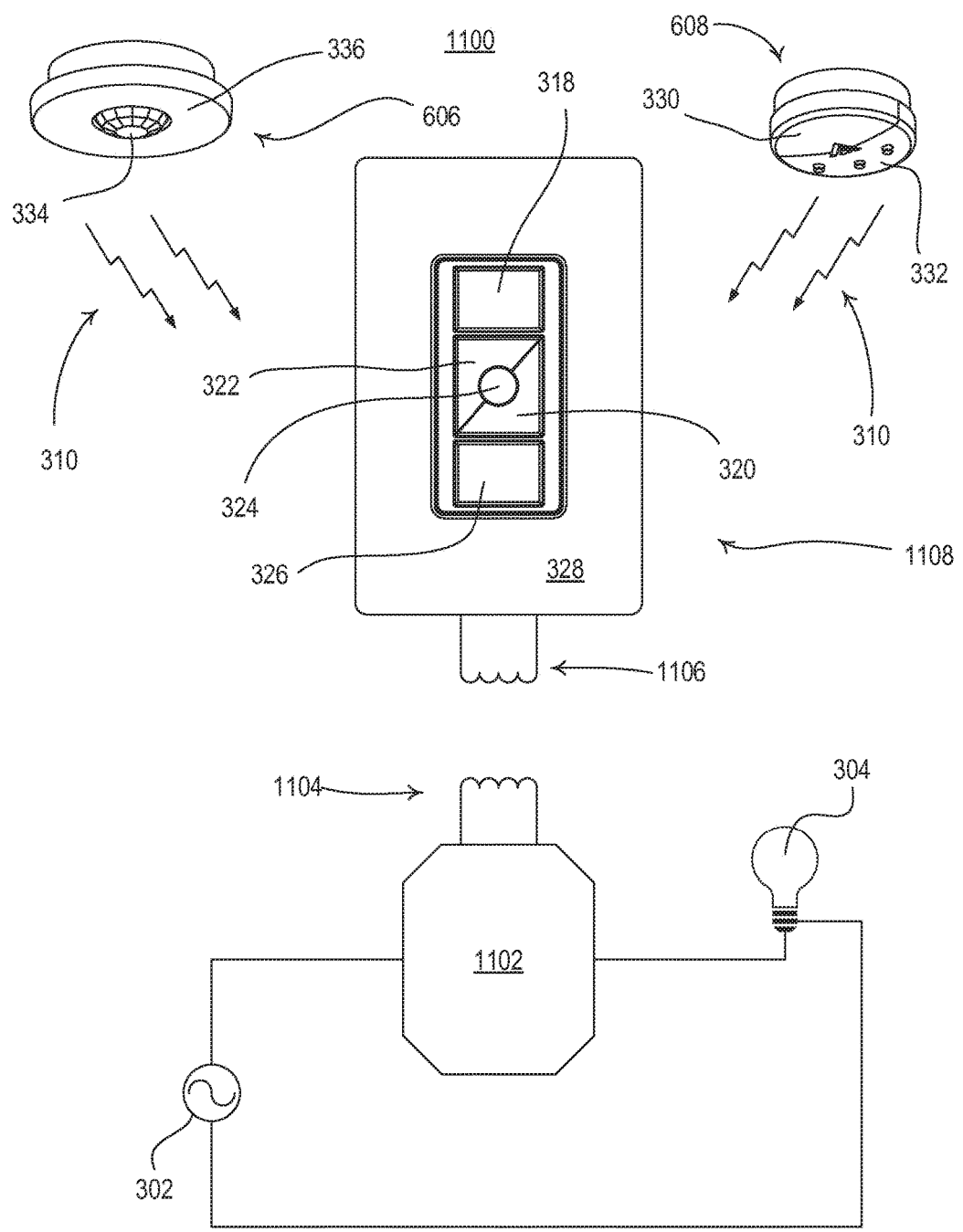
FIG. 11 depicts a third example embodiment of a load control system disclosed herein, with magnetic coupling between the remote control device and the load control device.

FIG. 11 depicts an example embodiment of a load control system 1100 disclosed herein, with magnetic coupling between a remote control 1108 and the load control device 1102. As in the other embodiments described herein, the load control device 1102 and the remote control 1108 may be adapted to be mounted to a single electrical wallbox. However, the load control device 1102 and the remote control 1108, illustrated in FIG. 11, include respective inductive coils 1104, 1106, which may be magnetically coupled together (e.g., inside the wallbox to which the load control device 1102 and the remote control 1108 may be mounted). The load control device 1102 and the remote control 1108 are operable to communicate with each other via the inductive coupling of the inductive coils 1104, 1106. The remote control 1108 may include an RF communication circuit and may be operable to receive digital messages (e.g., including association information or instructions/settings for controlling the electrical load 304) from other remote control devices, such as the occupancy sensor 606 or the daylight sensor 608, for example, via the RF signals 310. The remote control 1108 may then be operable to retransmit the information in the received digital messages to the load control device 1102 via the inductive coupling of the inductive coils 1104, 1106.

The remote control 1108 may be charged via energy derived from the inductive coupling of the inductive coils 1104, 1106. For example, the remote control 1108 may include a battery 814 or other power source (not shown in FIG. 11) that may be charged via the energy derived from the inductive coupling of the inductive coils 1104, 1106. Alternatively, the remote control 1108 may be entirely powered from the inductive coupling of the inductive coils 1104, 1106. An example of an inductive charging system is described in U.S. Pat. No. 7,906,936, issued Mar. 15, 2011, RECHARGEABLE INDUCTIVE CHARGER, the entire disclosure of which is hereby incorporated by reference.

Figure 12:
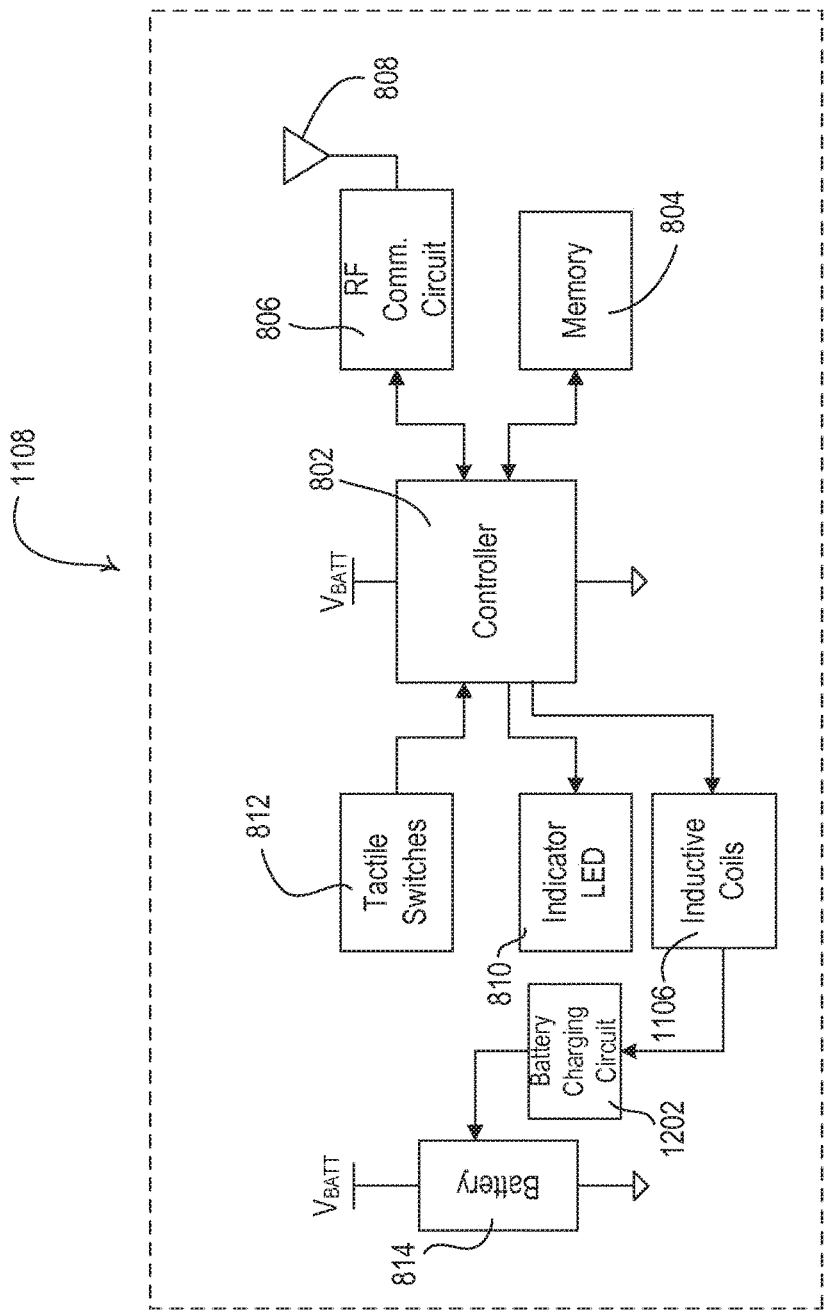
FIG. 12 is a functional block diagram of an example embodiment of a remote control device as disclosed herein, for magnetic coupling between the remote control device and the load control device.

FIG. 12 illustrates an example embodiment of the remote control 1108 disclosed herein. As illustrated in FIG. 12, the remote control 1108 may be similar to the other remote controls described herein, but the remote control 1108 may include inductive coils 1106 and/or a battery charging circuit 1202. The inductive coils 1106 of the remote control 1108 may receive messages from the controller 802 and may transmit messages to the load control device 1102 via the inductive coupling of the inductive coils 1106 with the inductive coils 1104 of the load control device 1102. The messages may include association information and/or instructions/settings for controlling the electrical load 304, for example. The instructions/settings may be received from another remote control device via RF communication circuit 806 and/or retrieved from the memory 804 of the remote control 1108.

The inductive coils 1106 may also be used, with the battery charging circuit 1202 for example, to charge the battery 814. The inductive coils 1106 may transmit energy received via inductive coupling to the battery charging circuit 1202. The battery charging circuit 1202 may use the energy received from the inductive coils 1106 to charge the battery 814 for powering the controller 802, the RF communication circuit 806, and other low voltage circuitry of the remote control 1108. In an alternative embodiment in which the remote control 1108 is entirely powered from the inductive coupling of the inductive coils 1106 with the inductive coils 1104 of the load control device 1102, the remote control 1108 may not include a battery 814. For example, the inductive coils 1106 of the remote control 1108 may be housed in an enclosure (not shown) that may be approximately the same size as the battery 814 of the remote control 1108, for example, and may be adapted to be installed in the battery compartment of the remote control 1108 to thus power the controller 802, the RF communication circuit 806, and other low voltage circuitry of the remote control 1108.

The remote controls described herein may alternatively be operable to charge the battery 814 from energy derived from radio-frequency (RF) signals received by the RF communication circuit 806, for example, as described in U.S. Pat. No. 7,812,771, issued Oct. 12, 2010, entitled METHOD AND APPARATUS FOR IMPLEMENTATION OF A WIRELESS POWER SUPPLY, the entire disclosure of which is hereby incorporated by reference.

Figure 13:
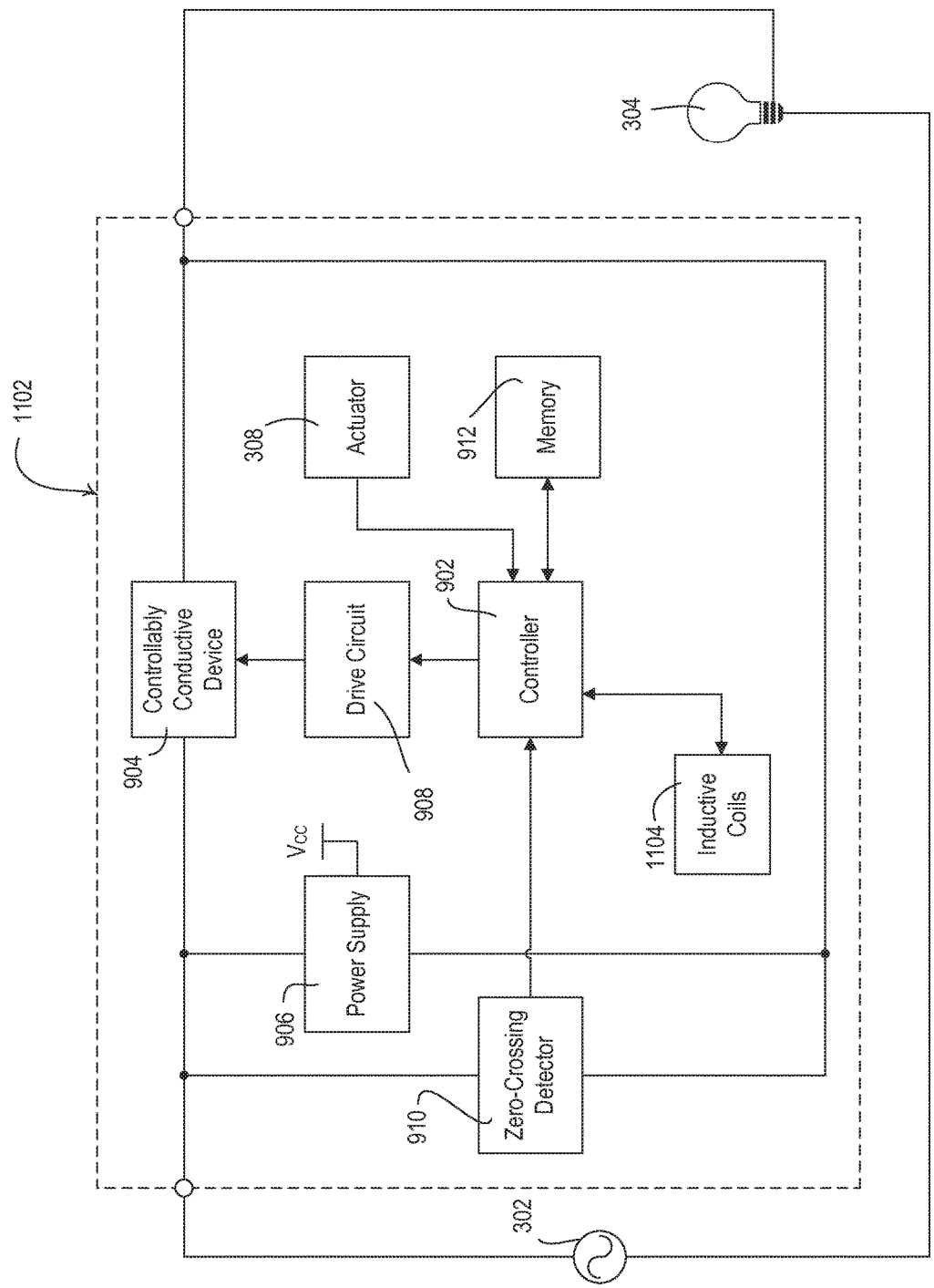
FIG. 13 is a functional block diagram of an example embodiment of a load control device as disclosed herein, for magnetic coupling between the remote control device and the load control device.

FIG. 13 illustrates an example embodiment of the load control device 1102 disclosed herein. As illustrated in FIG. 13, the load control device 1102 may be similar to the other load control devices described herein, but the load control device 1102 may include inductive coils 1104. The inductive coils 1104 of the load control device 1102 may receive messages from the remote control 1108 via inductive coupling of the inductive coils 1104 of the load control device 1102 and the inductive coils 1106 of the remote control 1108. The received messages may be transmitted to the controller 902. The received messages may include association information (e.g., unique identifier), instructions/settings for controlling the load 304, and/or other information that may be stored in memory 912 and/or used by the controller 902. The inductive coils 1104 may also be used to transmit energy for charging the remote control 1108 via inductive coupling with the inductive coils 1106 of the remote control 1108.

Figure 14:
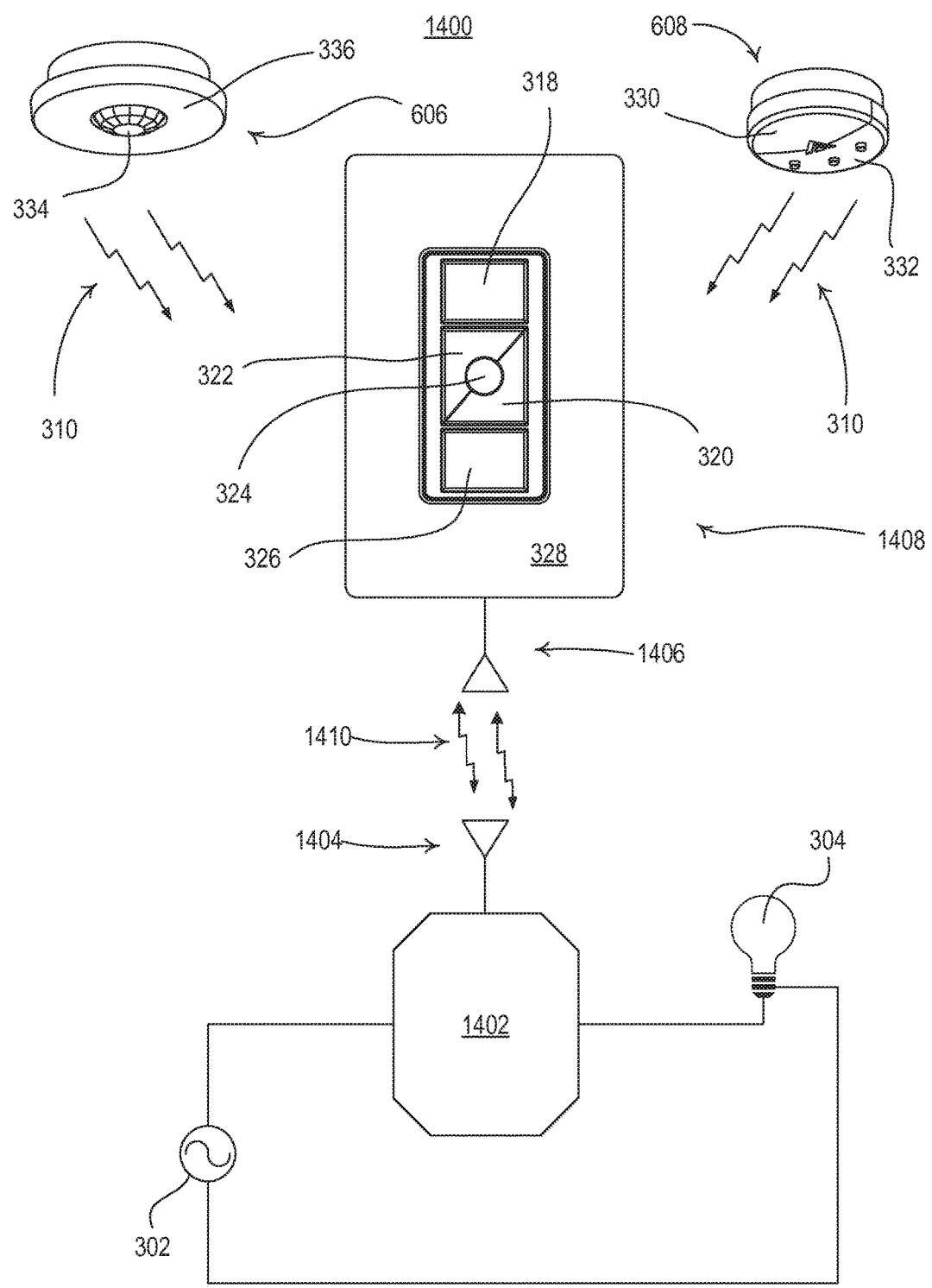
FIG. 14 depicts a fourth example embodiment of a load control system disclosed herein, with near field communication between the remote control device and the load control device.

FIG. 14 depicts an example embodiment of a load control system 1400 disclosed herein, having a remote control 1408 and a load control device 1402 operable to communicate via near field communication (NFC) signals 1410. As in the other embodiments described herein, the load control device 1402 and the remote control 1408 may be adapted to be mounted to a single electrical wallbox. The load control device 1402 and the remote control 1408 include respective antennas 1404, 1406, which are operable to communicate via NFC signals 1410 when the remote control 1408 is close to the load control device 1402 (e.g., inside the wallbox to which the load control device 1402 and the remote control 1408 may be mounted). The proximity of the remote control 1408 to the load control device 1402 may be close enough for successfully transmitting the NFC signals 1410 based on the signal-to-noise ratio, error coding, etc. The remote control 1408 may include an RF communication circuit and may be operable to receive digital messages via the RF signals 310. The digital messages may include association information and/or instructions/settings for controlling the electrical load 304 from other remote control devices, such as the occupancy sensor 606 or the daylight sensor 608, for example. The remote control 1408 may then be operable to retransmit the received instructions/settings to the load control device 1402 via the NFC signals 1410.

The remote control 1408 may be charged via energy derived from the NFC signals 1410. For example, the remote control 1408 may include a battery 814 or other power source (not shown in FIG. 14) that may be charged via the energy derived from the NFC signals 1410. Alternatively, the remote control 1408 may be entirely powered from the NFC signals 1410.

Figure 15:
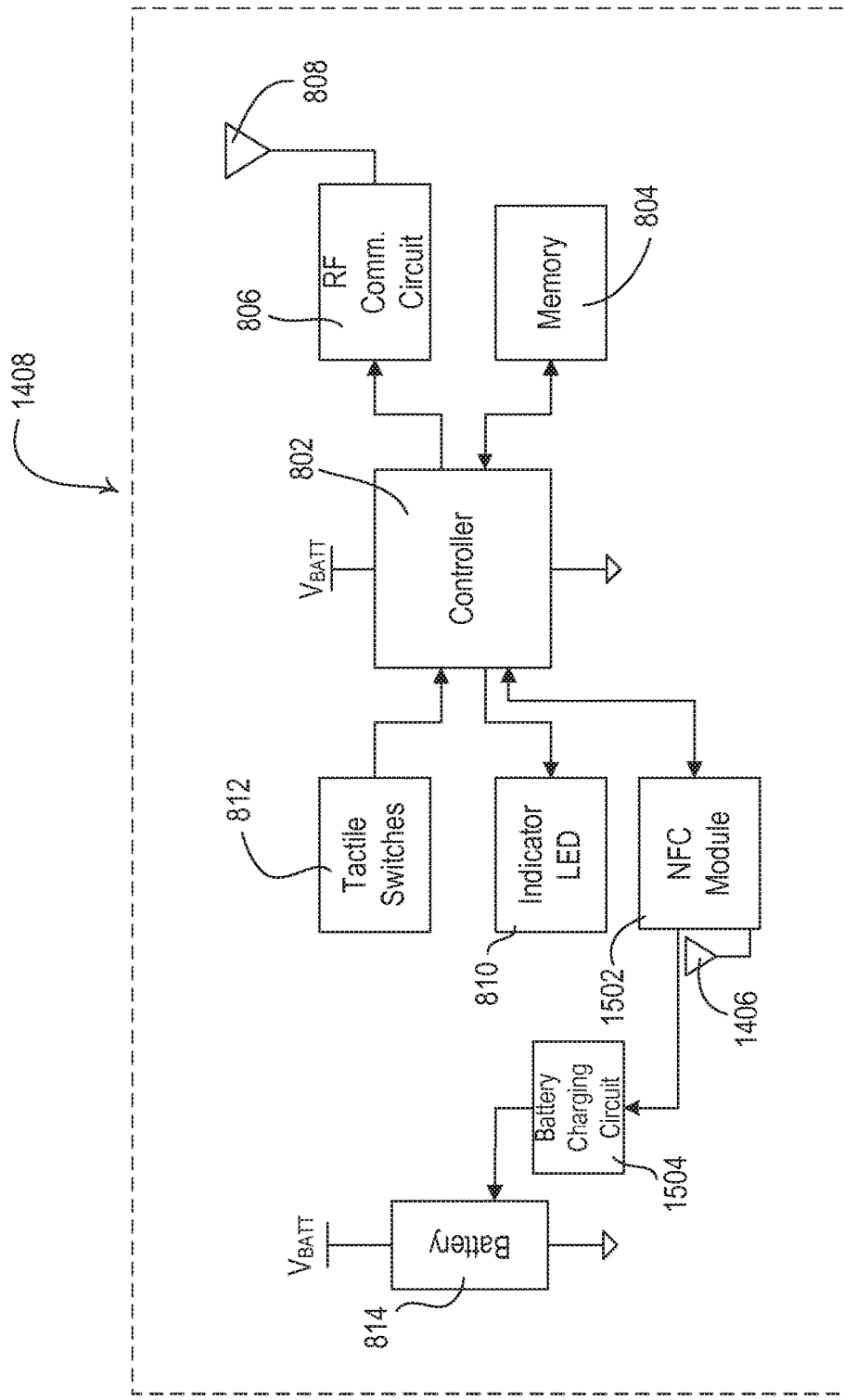
FIG. 15 is a functional block diagram of an embodiment of a remote control device as disclosed herein, for near field communication between the remote control device and the load control device.

FIG. 15 illustrates an example embodiment of the remote control 1408 disclosed herein. As illustrated in FIG. 15, the remote control 1408 may be similar to the other remote controls described herein, but the remote control 1408 may include an NFC module 1502 (e.g., an NFC circuit) and/or a battery charging circuit 1504. The NFC module 1502 may receive messages from the controller 802 for transmission to the load control device 1402 via the NFC signals 1410. The messages may be transmitted using the antenna 1406, for example. The messages may include association information and/or instructions/settings for controlling the electrical load 304, for example. The association information and/or instructions/settings may be received from another remote control device via RF communication circuit 806 and/or retrieved from the memory 804 of the remote control 1408.

The NFC module 1502 may also be used, with the battery charging circuit 1504 for example, to charge the battery 814. The NFC module 1502 may transmit energy received via the NFC signals 1410 to the battery charging circuit 1504. The battery charging circuit 1504 may use the energy from the NFC module 1502 to charge the battery 814 for powering the controller 802, the RF communication circuit 806, and other low voltage circuitry of the remote control 1408. In an alternative embodiment in which the remote control 1408 is entirely powered by the energy received via the NFC signals 1410, the remote control 1408 may not include a battery 814. For example, the NFC module 1502 of the remote control 1408 may be housed in an enclosure (not shown) that may be approximately the same size as the battery 814 of the remote control 1408, for example, and may be adapted to be installed in the battery compartment of the remote control 1408 to thus power the controller 802, the RF communication circuit 806, and other low voltage circuitry of the remote control 1408.

Figure 16:
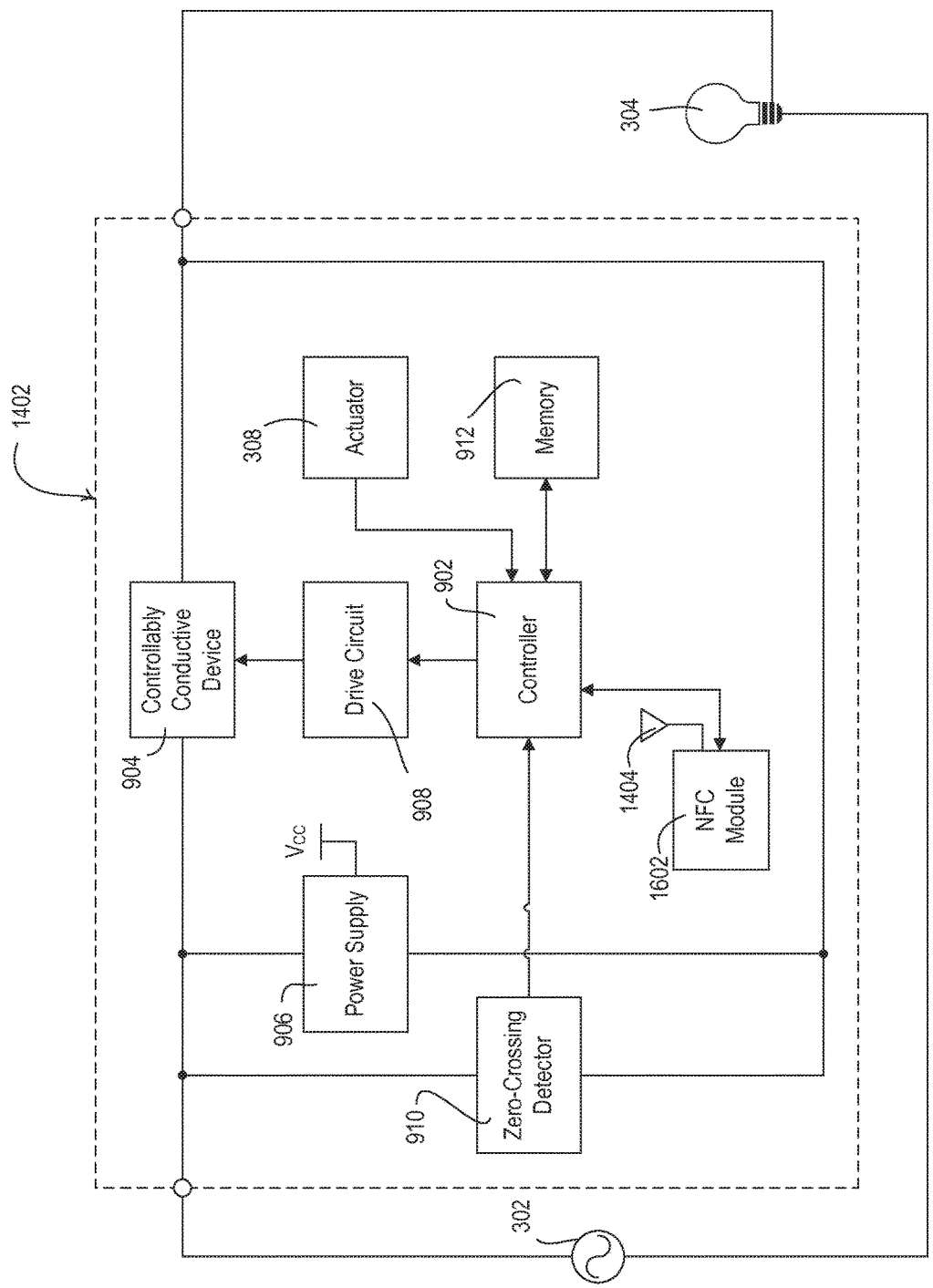
FIG. 16 is a functional block diagram of an example embodiment of a load control device as disclosed herein, for near field communication between the remote control device and the load control device.

FIG. 16 illustrates an example embodiment of the load control device 1402 disclosed herein. As illustrated in FIG. 16, the load control device 1402 may be similar to the other load control devices described herein, but the load control device 1402 may include NFC module 1602. The NFC module 1602 may receive messages from the remote control 1408 via NFC signals 1410. The messages may be received using the antenna 1404, for example, and may be transmitted to the controller 902. The received messages may include association information (e.g., a unique identifier), instructions/settings for controlling the load 304, and/or other information that may be stored in memory 912 and/or used by the controller 902 to control the load 304. The NFC module 1602 may also be used to transmit energy via the antenna 1404 for charging the remote control 1408.

What is claimed is:

1. A load control system comprising:
   a device
   comprising a second inductive coil and one or more buttons configured to be actuated by a user;
      wherein the device is configured to wirelessly transmit load control settings via the second inductive coil in response to an actuation of the one or more buttons by a user; and
      wherein the device is further configured to be attached to a wallbox such that the device, when attached, is located on an outside of the wallbox; and
   a load control device configured to control an amount of power delivered from an AC power source to an electrical load and further configured to be located inside the wallbox, the load control device comprising:
      a first inductive coil, wherein the first inductive coil is configured to wirelessly receive the load control settings via magnetic coupling from the second inductive coil of the device, wherein the load control settings are configured to enable control of an operation of the load control device; and
      a controller configured to control the operation of the load control device based on the load control settings received via the magnetic coupling from the second inductive coil of the device in response to the actuation of the one or more buttons of the device.

2. The load control system of claim 1, wherein the first inductive coil of the load control device is configured to wirelessly receive load control instructions via the magnetic coupling from the second inductive coil of the device, wherein the load control instructions are configured to control the operation of the load control device.

3. The load control system of claim 1, wherein the first inductive coil of the load control device is configured to wirelessly receive association information via the magnetic coupling from the second inductive coil of the device, wherein the association information comprises information configured to associate the device with the load control device for the device to control the electrical load via the load control device.

4. The load control system of claim 3, wherein the association information comprises information configured to associate a second device with the load control device.

5. The load control system of claim 1, wherein the device further comprises a power supply, and wherein the device is configured to charge the power supply of the device using energy derived from the magnetic coupling.

6. The load control system of claim 1, wherein the operation comprises providing the amount of power from the AC power source to the electrical load.

7. A method for controlling an amount of power delivered from an AC power source to an electrical load, the method comprising:
wirelessly receiving, by a load control device from a device, load control settings via magnetic coupling between a first inductive coil of the load control device and a second inductive coil of the device, wherein:
the load control settings are wirelessly transmitted by the device in response to an actuation of one or more buttons of the device by a user;
the load control settings are configured to enable control of an operation of the load control device,
the device is attached to a wallbox such that the device is located on an outside of the wallbox, and
the load control device is located inside the wallbox; and
controlling, by the load control device, the operation of the load control device based on the load control settings received via the magnetic coupling from the second inductive coil of the device in response to the actuation of the one or more buttons of the device.

8. The method of claim 7, further comprising wirelessly receiving, by the load control device, load control instructions via the magnetic coupling between the first inductive coil of the load control device and the second inductive coil of the device, wherein the load control instructions are configured to control the operation of the load control device.

9. The method of claim 7, further comprising wirelessly receiving, by the load control device, association information via the magnetic coupling between the first inductive coil of the load control device and the second inductive coil of the device, wherein the association information comprises information configured to associate the device with the load control device for the device to control the electrical load via the load control device.

10. The method of claim 9, wherein the association information comprises information configured to associate a second device with the load control device.

11. The method of claim 7, wherein the device further comprises a power supply, and wherein the method further comprises charging the power supply of the device using energy derived from the magnetic coupling.

12. The method of claim 7, wherein the operation comprises providing the amount of power from the AC power source to the electrical load.

13. A load control system comprising a device and a load control device, wherein:
the device comprises a second near field communication (NFC) module and one or more buttons, and is configured to be attached to a wallbox such that the device, when attached, is located on an outside of the wallbox; and
the device is configured to receive an actuation of the one or more buttons, and in response to the actuation, wirelessly transmit load control settings via the second NFC module;
the load control device is configured to control an amount of power delivered from an AC power source to an electrical load and is further configured to be located inside the wallbox, the load control device comprising:
a first NFC module, wherein the first NFC module is configured to wirelessly receive the load control settings via NFC signals from the second NFC module of the device, wherein the load control settings are configured to enable control of an operation of the load control device; and
a controller configured to control the operation of the load control device based on the load control settings received via the NFC signals from the second NFC module of the device in response to the actuation of the one or more buttons of the device.

14. The load control system of claim 13, wherein the first NFC module of the load control device is configured to wirelessly receive load control instructions via the NFC signals from the second NFC module of the device, wherein the load control instructions are configured to control the operation of the load control device.

15. The load control system of claim 13, wherein the first NFC module of the load control device is configured to wirelessly receive association information via the NFC signals from the second NFC module of the device, wherein the association information comprises information configured to associate the device with the load control device for the device to control the electrical load via the load control device.

16. The load control system of claim 15, wherein the association information comprises information configured to associate a second device with the load control device.

17. The load control system of claim 13, wherein the operation comprises providing the amount of power from the AC power source to the electrical load.

18. A method for controlling an amount of power delivered from an AC power source to an electrical load, the method comprising:
wirelessly receiving, by a load control device from a device, load control settings via near field communication (NFC) signals transmitted between a first NFC module of the load control device and a second NFC module of the device, wherein:
the load control settings are wirelessly transmitted by the device in response to an actuation of one or more buttons of the device by a user,
the load control settings are configured to enable control of an operation of the load control device,
the device is attached to a wallbox such that the device is located on an outside of the wallbox, and
the load control device is located inside the wallbox; and controlling, by the load control device, the operation of the load control device based on the load control settings received via the NFC signals from the second NFC module of the device in response to an actuation of the one or more buttons of the device.

19. The method of claim 18, further comprising wirelessly receiving, by the load control device, load control instructions via the NFC signals transmitted between the first NFC module and the second NFC module, wherein the load control instructions are configured to control the operation of the load control device.

20. The method of claim 18, further comprising wirelessly receiving, by the load control device, association information via the NFC signals transmitted between the first NFC module and the second NFC module, wherein the association information comprises information configured to associate the device with the load control device for the device to control the electrical load via the load control device.

21. The method of claim 20, wherein the association information comprises information configured to associate a second device with the load control device.

22. The method of claim 18, wherein the operation comprises providing the amount of power from the AC power source to the electrical load.

23. The load control system of claim 1,
wherein the device further comprises a wireless module that is separate from the second inductive coil and is configured to receive messages; and
wherein the device is further configured to wirelessly communicate messages via the second inductive coil to the load control device based on messages received via the wireless module.

24. The method of claim 7, further comprising:
receiving, by the device, messages via a wireless module of the device, wherein the wireless module is separate from the second inductive coil; and
wirelessly communicating, by the device, messages via the second inductive coil to the load control device based on the messages received via the wireless module.

25. The load control system of claim 13,
wherein the device further comprises a wireless module that is separate from the second NFC module and is configured to receive messages; and
wherein the device is further configured to wirelessly communicate messages via the second NFC module to the load control device based on messages received via the wireless module.

26. The method of claim 18, further comprising:
receiving, by the device, messages via a wireless module of the device, wherein the wireless module is separate from the second NFC module; and
wirelessly communicating, by the device, messages via the second NFC module to the load control device based on the messages received via the wireless module.

* * * * *